(12) United States Patent
Saily et al.

(10) Patent No.: US 11,259,360 B2
(45) Date of Patent: Feb. 22, 2022

(54) MULTICAST TRAFFIC AREA MANAGEMENT AND MOBILITY FOR WIRELESS NETWORK

(71) Applicant: NOKIA TECHNOLOGIES OY, Espoo (FI)

(72) Inventors: Mikko Saily, Laukkoski (FI); David Navrátil, Helsinki (FI); Athul Prasad, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,544

(22) PCT Filed: Feb. 26, 2018

(86) PCT No.: PCT/EP2018/054647
§ 371 (c)(1),
(2) Date: Aug. 24, 2020

(87) PCT Pub. No.: WO2019/161927
PCT Pub. Date: Aug. 29, 2019

(65) Prior Publication Data
US 2021/0378053 A1 Dec. 2, 2021

(51) Int. Cl.
*H04W 76/40* (2018.01)
*H04W 48/20* (2009.01)
*H04W 4/06* (2009.01)

(52) U.S. Cl.
CPC ............ *H04W 76/40* (2018.02); *H04W 4/06* (2013.01); *H04W 48/20* (2013.01)

(58) Field of Classification Search
CPC ......... H04W 4/02; H04W 4/06; H04W 12/03; H04W 12/04; H04W 12/06;
(Continued)

(56) References Cited

U.S. PATENT DOCUMENTS 7,885,199 B2    2/2011 Mooney et al.
9,019,987 B1*   4/2015 Marupaduga ........... H04W 4/12
                                                    370/465
(Continued)

FOREIGN PATENT DOCUMENTS

WO    03047149 A2    6/2003
WO    2016029938 A1  3/2016

OTHER PUBLICATIONS

International Search Report and Written Opinion for International Application No. PCT/EP2018/054647, dated May 18, 2018, 17 pages.
(Continued)

*Primary Examiner* — Jean A Gelin
(74) *Attorney, Agent, or Firm* — Brake Hughes Bellermann LLP

(57) ABSTRACT

A technique includes transmitting a request for the delivery of multicast data; receiving the multicast data via a unicast data radio bearer or a multicast data radio bearer, wherein the user device is located in a first cell; receiving, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located; entering, by the user device, a low activity state in response to the connection suspend message; and, receiving, by the user device, the multicast data via the multicast data radio bearer.

20 Claims, 15 Drawing Sheets

(58) Field of Classification Search
CPC ......... H04W 36/0007; H04W 36/0009; H04W 36/0011; H04W 36/0055; H04W 48/20; H04W 76/30; H04W 76/40; H04L 12/1868; H04L 12/185; H04L 63/0428
See application file for complete search history.

(56) References Cited

U.S. PATENT DOCUMENTS

| | | | |
|---|---|---|---|
| 9,642,116 B2 | 5/2017 | Shang et al. | |
| 2004/0266440 A1* | 12/2004 | Fuchs | H04L 12/1836 455/445 |
| 2005/0281270 A1 | 12/2005 | Kossi et al. | |
| 2006/0166653 A1* | 7/2006 | Xu | H04W 4/06 455/412.2 |
| 2007/0259673 A1* | 11/2007 | Willars | H04L 67/141 455/453 |
| 2009/0080538 A1* | 3/2009 | Shen | H04N 5/08 375/240.28 |
| 2009/0196213 A1* | 8/2009 | Zhong | H04W 36/06 370/312 |
| 2010/0216454 A1* | 8/2010 | Ishida | H04W 72/005 455/424 |
| 2013/0188547 A1* | 7/2013 | Moriwaki | H04W 28/06 370/312 |
| 2013/0208699 A1* | 8/2013 | Hakkinen | H04W 76/38 370/331 |
| 2013/0294320 A1* | 11/2013 | Jactat | H04W 48/12 370/312 |
| 2013/0315130 A1* | 11/2013 | Enomoto | H04W 72/005 370/312 |
| 2014/0153474 A1 | 6/2014 | Zhao et al. | |
| 2015/0109986 A1* | 4/2015 | Siomina | H04W 72/005 370/312 |
| 2015/0124686 A1 | 5/2015 | Zhang et al. | |
| 2015/0208379 A1 | 7/2015 | Lin | |
| 2015/0327299 A1* | 11/2015 | Koskinen | H04W 36/0007 370/329 |
| 2015/0341183 A1* | 11/2015 | Song | H04L 12/4645 370/390 |
| 2016/0173362 A1* | 6/2016 | Qu | H04L 49/25 370/401 |
| 2016/0285923 A1* | 9/2016 | Kodaypak | H04L 43/0817 |
| 2016/0302040 A1* | 10/2016 | Burroughs | H04W 4/023 |
| 2016/0337817 A1* | 11/2016 | Malladi | H04W 4/06 |
| 2016/0360383 A1* | 12/2016 | Morita | H04W 4/06 |
| 2016/0374050 A1* | 12/2016 | Prasad | H04L 12/1868 |
| 2017/0374581 A1* | 12/2017 | Dao | H04W 76/40 |
| 2018/0206080 A1* | 7/2018 | Chen | H04W 4/50 |
| 2018/0242206 A1* | 8/2018 | Kim | H04W 36/08 |
| 2018/0279159 A1* | 9/2018 | Zeller | H04W 76/10 |
| 2018/0310056 A1* | 10/2018 | Matute Arribas | H04L 67/22 |
| 2018/0317263 A1* | 11/2018 | Ishii | H04W 74/0833 |
| 2019/0124623 A1* | 4/2019 | Xu | H04W 76/40 |
| 2019/0158985 A1* | 5/2019 | Dao | H04L 67/147 |
| 2019/0373661 A1* | 12/2019 | Kousaridas | H04L 67/146 |
| 2020/0084655 A1* | 3/2020 | Fiorani | H04W 52/0222 |
| 2021/0058748 A1* | 2/2021 | Liao | H04W 76/11 |
| 2021/0142781 A1* | 5/2021 | Koyanagi | H04N 7/15 |

OTHER PUBLICATIONS

3GPP TR 23.270; V13.0.0; 3rd Generation Partnership Project; Technical Specification Group Services and System Aspects; Study on architecture enhancements for Cellular Internet of Things (Release 13); Mar. 2016; Sophia Antipolis, France; 94 pages.

3GPP TS 38.300; V15.0.0; 3rd Generation Partnership Project; Technical Specification Group Radio Access Network; NR; NR and NG-RAN Overall Description; Stage 2 (Release 15); Dec. 2017; Sophia Antipolis, France; 68 pages.

3GPP TS 38.331; V15.0.0; 3rd Generation Partnership Project; Technical Specification Group Radio Access Network NR Radio Resource Control (RRC) protocol specification (Release 15); Dec. 2017; Sophia Antipolis, France; 188 pages.

3GPP TS 38.423; V0.6.0; 3rd Generation Partnership Project; Technical Specification Group Radio Access Network; NG-RAN; Xn application protocol (XnAP) (Release 15); Jan. 2018; Sophia Antipolis, France; 76 pages.

3GPP TS 38.420 V0.6.0; 3rd Generation Partnership Project; Technical Specification Group Radio Access Network; NG-RAN; Xn general aspects and principles (Release 15); Feb. 2018; Sophia Antipolis, France; 12 pages.

Gluhak et al.; "Multicast Bearer Selection in Heterogeneous Wireless Networks"; IEEE International Conference on Communications; May 16-20, 2005; Seoul, South Korea; 6 pages.

Nguyen et al.; "Service Continuity for eMBMS in LTE/LTE-Advanced Network: Standard Analysis and Supplement"; 11th IEEE Consumer Communication and Networking Conference, Jan. 10-13, 2014; Las Vegas, Nevada, USA; 6 pages.

First Examination Report for Indian Application No. 202047041178, dated Dec. 1, 2021, 7 pages.

* cited by examiner

MULTICAST TRAFFIC AREA MANAGEMENT AND MOBILITY FOR WIRELESS NETWORK

CROSS-REFERENCE TO RELATED APPLICATIONS

This application is a national stage entry of International Application No. PCT/EP2018/054647, filed Feb. 26, 2018, entitled "MULTICAST TRAFFIC AREA MANAGEMENT AND MOBILITY FOR WIRELESS NETWORK" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services. BSs in 5G/NR may be referred to as gNBs.

SUMMARY

According to an example embodiment, a method includes determining, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data; transmitting, by the base station, the multicast data via a unicast data radio bearer or a multicast data radio bearer to a first user device that is in a connected state and is located in a first cell that is outside of the RMA; detecting a low unicast activity with respect to the first user device; sending, by the base station to the first user device, a connection suspend message to cause the first user device to enter a low activity state; and updating the RMA to add the first cell where the first user device, while continuing to send the multicast data to the first user device via the multicast data radio bearer.

According to an example embodiment, an apparatus includes at least one processor and at least one memory including computer instructions, when executed by the at least one processor, cause the apparatus to: determine, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data; transmit, by the base station, the multicast data via a unicast data radio bearer or a multicast data radio bearer to a first user device that is in a connected state and is located in a first cell that is outside of the RMA; detect a low unicast activity with respect to the first user device; send, by the base station to the first user device, a connection suspend message to cause the first user device to enter a low activity state; and update the RMA to add the first cell where the first user device, while continuing to send the multicast data to the first user device via the multicast data radio bearer.

According to an example embodiment, a computer program product includes a computer-readable storage medium and storing executable code that, when executed by at least one data processing apparatus, is configured to cause the at least one data processing apparatus to perform a method including: determining, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data; transmitting, by the base station, the multicast data via a unicast data radio bearer or a multicast data radio bearer to a first user device that is in a connected state and is located in a first cell that is outside of the RMA; detecting a low unicast activity with respect to the first user device; sending, by the base station to the first user device, a connection suspend message to cause the first user device to enter a low activity state; and updating the RMA to add the first cell where the first user device, while continuing to send the multicast data to the first user device via the multicast data radio bearer.

According to an example embodiment, a method includes transmitting, by a user device that is in a connected state, a request for the delivery of multicast data; receiving, by the user device from a base station, the multicast data via a unicast data radio bearer or a multicast data radio bearer, wherein the user device is located in a first cell; receiving, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located; entering, by the user device, a low activity state in response to the connection suspend message; receiving, by the user device, the multicast data via the multicast data radio bearer.

According to an example embodiment, an apparatus includes at least one processor and at least one memory including computer instructions, when executed by the at least one processor, cause the apparatus to: transmit, by a user device that is in a connected state, a request for the delivery of multicast data; receive, by the user device from a base station, the multicast data via a unicast data radio bearer or a multicast data radio bearer, wherein the user device is located in a first cell; receive, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located; enter, by the user device, a low activity state in response to the connection suspend message; receive, by the user device, the multicast data via the multicast data radio bearer.

According to an example embodiment, a computer program product includes a computer-readable storage medium and storing executable code that, when executed by at least one data processing apparatus, is configured to cause the at least one data processing apparatus to perform a method including: transmitting, by a user device that is in a connected state, a request for the delivery of multicast data; receiving, by the user device from a base station, the multicast data via a unicast data radio bearer or a multicast data radio bearer, wherein the user device is located in a first cell; receiving, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located; entering, by the user device, a low activity state in response to the connection suspend message; receiving, by the user device, the multicast data via the multicast data radio bearer.

According to an example embodiment, a method includes receiving, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data; selecting a second cell; determining that the second cell is outside of the set of one or more cells for the RMA; sending a connection resume request to the second cell indicating mobility of the user device to the second cell outside that is outside of the set of one or more cells of the RMA; receiving, by the user device, information identifying an updated set of one or more cells for the RMA, including information identifying the second cell; and receiving, by the user device via the second cell, the multicast data via the multicast data radio bearer.

According to an example embodiment, an apparatus includes at least one processor and at least one memory including computer instructions, when executed by the at least one processor, cause the apparatus to: receive, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data; select a second cell; determine that the second cell is outside of the set of one or more cells for the RMA; send a connection resume request to the second cell indicating mobility of the user device to the second cell outside that is outside of the set of one or more cells of the RMA; receive, by the user device, information identifying an updated set of one or more cells for the RMA, including information identifying the second cell; and receive, by the user device via the second cell, the multicast data via the multicast data radio bearer.

According to an example embodiment, a computer program product includes a computer-readable storage medium and storing executable code that, when executed by at least one data processing apparatus, is configured to cause the at least one data processing apparatus to perform a method including: receiving, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data; selecting a second cell; determining that the second cell is outside of the set of one or more cells for the RMA; sending a connection resume request to the second cell indicating mobility of the user device to the second cell outside that is outside of the set of one or more cells of the RMA; receiving, by the user device, information identifying an updated set of one or more cells for the RMA, including information identifying the second cell; and receiving, by the user device via the second cell, the multicast data via the multicast data radio bearer.

According to an example embodiment, a method includes receiving, by a user device that is in a low activity state via a first cell, a multicast data via a multicast data radio bearer associated with a radio access network (RAN) multicast area (RMA) for the delivery of the multicast data, wherein the RMA includes a set of at least one cell in which the multicast data is transmitted over the multicast data radio bearer to at least one user device that have requested delivery of the multicast data; measuring at least a second cell; determining that the second cell is outside of the set of at least one cell for the RMA and that criteria for a connection resumption with respect to the second cell were met, wherein the criteria comprises at least a signal quality of the first cell and a signal quality of the neighbor cell; establishing a connection with the first cell; and sending, by the user device to the first cell, a measurement report message including at least a measurement of the second cell that is outside the RMA for which criteria for the connection resumption was met.

According to an example embodiment, an apparatus includes at least one processor and at least one memory including computer instructions, when executed by the at least one processor, cause the apparatus to: receive, by a user device that is in a low activity state via a first cell, a multicast data via a multicast data radio bearer associated with a radio access network (RAN) multicast area (RMA) for the delivery of the multicast data, wherein the RMA includes a set of at least one cell in which the multicast data is transmitted over the multicast data radio bearer to at least one user device that have requested delivery of the multicast data; measure at least a second cell; determine that the second cell is outside of the set of at least one cell for the RMA and that criteria for a connection resumption with respect to the second cell were met, wherein the criteria comprises at least a signal quality of the first cell and a signal quality of the neighbor cell; establish a connection with the first cell; and send, by the user device to the first cell, a measurement report message including at least a measurement of the second cell that is outside the RMA for which criteria for the connection resumption was met.

According to an example embodiment, a computer program product includes a computer-readable storage medium and storing executable code that, when executed by at least one data processing apparatus, is configured to cause the at least one data processing apparatus to perform a method including: receiving, by a user device that is in a low activity state via a first cell, a multicast data via a multicast data radio bearer associated with a radio access network (RAN) multicast area (RMA) for the delivery of the multicast data, wherein the RMA includes a set of at least one cell in which the multicast data is transmitted over the multicast data radio bearer to at least one user device that have requested delivery of the multicast data; measuring at least a second cell; determining that the second cell is outside of the set of at least one cell for the RMA and that criteria for a connection resumption with respect to the second cell were met, wherein the criteria comprises at least a signal quality of the first cell and a signal quality of the neighbor cell; establishing a connection with the first cell; and sending, by the user device to the first cell, a measurement report message including at least a measurement of the second cell that is outside the RMA for which criteria for the connection resumption was met.

The details of one or more examples of embodiments are set forth in the accompanying drawings and the description below. Other features will be apparent from the description and drawings, and from the claims.

DETAILED DESCRIPTION

Figure 1:
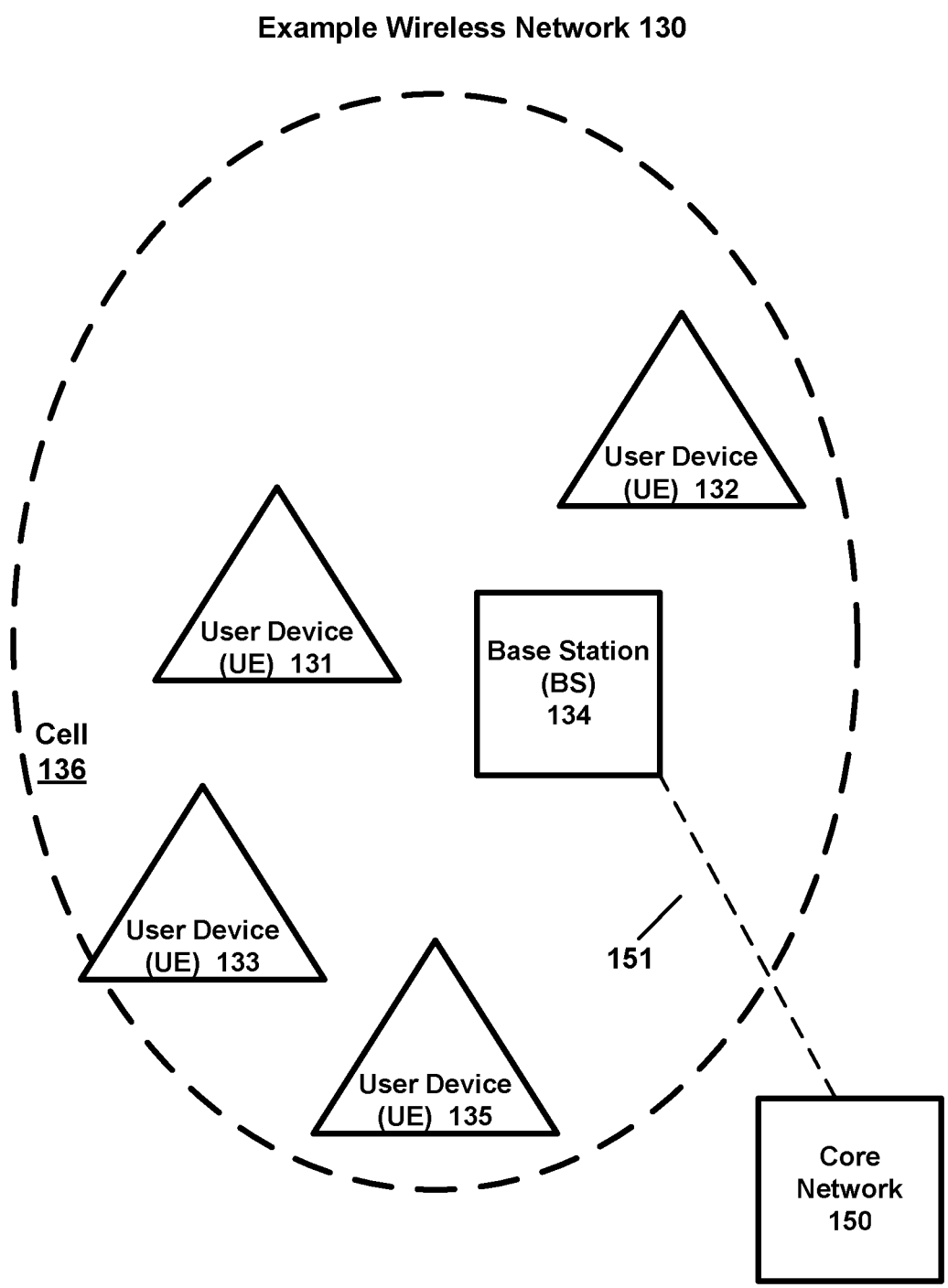
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) or gNB also may be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via e.g., a Si interface in LTE (or a NG interface in 5G/NR) 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. Also, a user device may also be, for example, a nearly exclusive downlink only device, that may download images, video, or other content from a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

According to an illustrative example, a unicast transmission may include transmission of a signal to one user device or UE. A multicast or broadcast transmission may include a transmission to multiple (or at least one or more) UEs. For example, UEs may join or subscribe to receive a multicast data transmission by indicating an interest in receiving the multicast data transmission, and then each UE may receive the multicast data based on a multicast group address or multicast identifier. Whereas, for example, one or more or all UEs may receive a broadcast transmission, which may not necessary be limited to UEs that have subscribed or indicated an interest in receiving such broadcast signal. Although, the distinction between multicast and broadcast may vary, depending on the application or technology.

According to an example embodiment, a radio bearer may include a data or signal delivery service between two points (e.g., unicast bearer), or between one source and multiple destinations (e.g., a multicast bearer). A radio (or wireless) bearer may typically be provided for a radio access network (RAN), between a UE and a BS or other network node(s). Each bearer may have its own set of characteristics, such as one or more quality of service (QoS) characteristics (e.g., such as maximum latency, a maximum or minimum data rate, or a maximum or minimum throughput, packet loss rates, maximum error rate, . . . ). A RAN may typically include one or more BSs, and one or more UEs that are located in cells provided by such BSs. Also, for example, as noted, a unicast data radio bearer may be a data delivery service that delivers data within a RAN via unicast transmission (point to point) from a source to a destination. Similarly, a multicast data radio bearer may be a data delivery service that provides for the delivery of data from a source to multiple (or at least one or more) multicast destination. A multicast group identifier (multicast group ID or multicast group address) may be used to identify the multicast group, and may be used by each receiving or subscribing UE to receive the multicast data.

In some cases, multicast transmission or broadcast transmission may, for example, be used when the same data or content is to be delivered to multiple UEs, for example. However, there are trade-offs (e.g., regarding efficiency and/or usage of network resources) for using a multicast transmission, as compared to using one or more unicast transmissions. For example, with a unicast transmission, the destination UE may provide signal measurement feedback, such as channel state information, where the BS may then adjust the transmission power and/or modulation and coding scheme (MCS) and/or other transmission parameters that are specific for the channel conditions for the channel between the BS and the UE. Also, a UE, in some cases, may request and obtain retransmission of data, e.g., via HARQ (hybrid ARQ) feedback, which may include sending an acknowledgement and/or negative acknowledgement. Thus, the transmission parameters and data transmission/retransmission may be adjusted or adapted for each UE in the case of unicast transmission.

On the other hand, a multicast transmission may be transmitted to multiple UEs, e.g., based on the worst case UE (which may use a MCS and transmission power to reliably transmit to the UE having the worst channel condition, for example). However, as the number of UEs receiving the same content increases, it becomes more efficient to provide a multicast transmission via one multicast data radio bearer, as opposed to transmission via multiple unicast data radio bearers. According to an example embodiment, combinations of unicast and multicast transmission may also be used, e.g., where a multicast data radio bearer may be used to transmit multicast data to a group of UEs, while a unicast data radio bearer may be used to transmit the same multicast data to one UE or multiple UEs.

In some networks, a wide-area delivery of multicast/broadcast content may be performed using multicast broadcast single frequency networks (MBSFN) areas where the same content is delivered over the air using synchronized time-frequency physical radio resources. For delivery of such content to a smaller area, single cell—point-to-multipoint (SC-PTM) technology was developed.

In 5G/NR (new radio), one possible application may be or may allow reuse of the flexibility of a unicast architecture and avoid static deployments and network elements of multicast/broadcast content delivery areas. A more flexible transmission of multicast data is desirable. Also, the content delivery area should allow multiple cells, if needed.

The traditional MBMS (Multimedia Broadcast/Multicast Service) architecture was designed for the delivery of linear broadcast content. The media landscape is changing rapidly and the consumption of traditional linear TV content has been declining. Therefore, at least in some cases, a 5G architecture may natively support dynamic delivery of popular content using unicast and multicast capabilities efficiently, but in a more flexible arrangement or approach.

The MBMS (Multimedia Broadcast/Multicast Service) architecture in 3GPP may be considered as an add-on feature that required new network entities and interfaces, e.g., and in some cases, may have had the application of a terrestrial broadcast of linear TV approach in mind. The MBMS uses the concept of MBMS service areas to define the part of network where broadcast content should be provided. The MBMS service areas are statically configured by O&M (operations and management within a core network) in various network entities such as BM-SC (Broadcast Multicast Service Center), eNBs/BSs. The problem is that this approach does not typically fit well with the new service models such as dynamic geographical broadcast areas based on user distribution, over-the-top media consumption and IoT services, as some illustrative examples. An example use case may include consumption of multimedia feeds during a live event by a large population of potentially moving users/UEs, although this is merely one illustrative example use case, and other uses/use cases may be used as well.

In 5G, according to an example case, a UE may be in one of three different states, including a Connected state, an Inactive state, and an Idle state. Some example characteristics are described below for an example of these three UE states, by way of illustrative examples.

In 5G: Idle state (e.g., RRC_IDLE): PLMN (public land mobile network) selection; (reception of) Broadcast of system information; Cell re-selection mobility; Paging for mobile terminated data is initiated by 5GC (5G core network); Paging for mobile terminated data area is managed by 5GC; DRX (discontinuous reception by UE) for CN (core network) paging configured by NAS (non-access stratum). Inactive state (e.g., RRC_INACTIVE): (reception of) Broadcast of system information; Cell re-selection mobility; Paging is initiated by NG-RAN (RAN paging; RAN-based notification area (RNA) is managed by NG-RAN; DRX for RAN paging configured by NG-RAN; 5GC-NG-RAN connection (both C/U-planes) is established for UE; The UE context is stored in NG-RAN and the UE; NG-RAN (BS) knows the RNA which the UE belongs to. Connected state (e.g., RRC_CONNECTED): 5GC-NG-RAN connection (both C/U-planes) is established for UE; The UE AS context is stored in NG-RAN and the UE; NG-RAN knows the cell which the UE belongs to; Transfer of unicast data to/from the UE; and, Network controlled mobility including measurements.

According to an example embodiment, a low activity state may be an energy saving state for a UE, for example. For example, a low activity state of a UE may be used by a network or BS to deliver multicast traffic (or multicast data) to the UE, while allowing the UE conserve energy. Thus, a low activity UE may receive multicast traffic. Also, in an example embodiment, or in at least some cases, a low activity state may also include a UE having a lower amount of unicast activity (as compared to a connected state, such as in RRC_Connected) in order to conserve energy at the UE. Thus, a low activity state may include a state in which a UE may transmit and/or receive an amount of unicast data or traffic that is less than an amount of unicast data that may be transmitted or received by a UE that is in a connected state (e.g., RRC_Connected state). In an example low activity state, a UE may monitor a physical downlink control channel (PDCCH) continuously and/or discontinuously. A low activity UE may also monitor a paging and/or a notification channel, and may receive a multicast transmission. A low activity state may be configurable. Therefore, a low activity state may, for example, include an Inactive state (e.g., RRC_Inactive state). Also, in some cases, a low activity state may also include a sub-state (e.g., which may include a state in which a UE may perform or have at least some or a sub-set of the functions or capabilities) of an Idle (e.g., RRC_Idle) state and/or a Connected (e.g., RRC_Connected) state. These are some examples of a low activity state, and other examples may be used or provided. Thus, RRC_Inactive state is an example of a low activity state. However, a low activity state may include or encompass other states, e.g., such as other UE states in which a UE may be in a power conserving state that may typically involve a reduced UE activity in one or more aspects (e.g., such as a reduced unicast traffic activity for the low activity UE), as compared to a connected state, while allowing the UE to receive a multicast signal.

Thus, for example, or in at least some cases, a UE in a connected state may receive data via either (or both) unicast data radio bearer and a multicast data radio bearer. Whereas, according to an example embodiment, a UE in a low activity state (e.g., RRC_Inactive state) may receive multicast data via multicast data radio bearer, but, at least in some cases (or for some low activity states), a low activity state UE may be unable to receive data via unicast data radio bearer (or, alternatively, in another example embodiment, a low activity UE may be able to receive less unicast data as compared to a Connected state). In an illustrative example of a low activity state (e.g., Inactive state), a UE may first need to transition from a low activity state (e.g., RRC_Inactive) to a Connected (e.g., RRC_Connected) state before receiving data via unicast data radio bearer from the BS. A more complete feedback channel(s) may be provided for a connected UE to allow the UE to send feedback to the BS, e.g., to provide CSI, HARQ ACK/NACK feedback, and/or other UE feedback. Whereas, by comparison, a more limited feedback channel may, for example, be provided for a low activity state UE, to allow the UE to conserve energy.

In some cases, challenges may exist in providing multicast data transmission to mobile low activity UEs, e.g., as the UEs change location (move between cells) and/or change state.

When a UE is in a connected state, the BS (or network) knows the location (to which cell the UE is connected and/or located) of the UE based on a connection request, and where any change in cell to a target cell is performed as a handover (typically upon request or coordination of the core network and/or serving BS). Thus, the network or BS will typically know the serving cell and beam of a connected UE. In addition, in at least some example embodiments or in some cases, a location (e.g., cell upon which the UE is camping on, and/or cell via which the low activity (e.g., Inactive) UE is receiving signals) of a low activity (e.g., RRC_Inactive) UE may be known to the network with the accuracy of a configured area (list of cells) for a RAN (radio access network or RAN-based) Notification Area (RNA). However, the RNA is static, and does not change for a UE while the UE is in an RRC_Inactive state, which is very inflexible. This may be particularly inadequate in the case of an low activity or inactive UE(s) moving from between cells while receiving multicast data. Further, the defined RNA does not expand over to new geographical area due to UE(s) in a low activity (e.g., Inactive) state reselecting outside the current RNA.

Various example embodiments may generally relate to unicast and/or multicast/broadcast data transmissions in cellular networks, and providing a solution to multicast area management (e.g., IP multicast area management for IP multicast data transmissions) in 5G networks (or other networks). According to an example embodiment, a RAN based Multicast Area (RMA) and related procedures may be provided to maintain and/or adjust a list of cells for a RMA, e.g., based on UE mobility and/or changes of UE's connectivity state, which provides a much more flexible approach.

According to an example embodiment, a BS may provide or configure a radio access network (RAN) multicast area (RMA), which may include an area defined by a set of one or more cells, in which multicast data (associated with the RMA) is transmitted via a multicast data radio bearer (multicast DRB). According to an illustrative example embodiment, any cell in which the multicast DRB is configured (e.g., to allow UEs to receive the multicast data associated with the RMA via multicast DRB) may be part of the RMA. A BS may determine which cells should be part of the RMA for a multicast data.

According to an example embodiment, a connected UE may receive multicast data via either a unicast DRB or a multicast DRB, while an inactive UE may only receive multicast data via a multicast DRB. A BS may, for example, determine whether to deliver (transmit) multicast data to a connected UE via either unicast DRB (e.g., if the UE is located in a cell that is outside the UE), or via multicast DRB. Various factors or criteria may be considered by the BS to determine whether a connected UE should receive multicast data via unicast DRB or multicast DRB. However, once a BS transitions a UE from connected state to inactive state, such inactive UE may receive (or continue receiving) the multicast data only via a multicast DRB, and not (for example) via a unicast DRB (e.g., because, at least in some cases, unicast communications may not necessarily be available or provided for inactive UEs).

Furthermore, a RMA may be an area in which an inactive or low activity (e.g., RRC_Inactive) UE can move and receive multicast data (associated with the RMA), without necessarily notifying a serving BS or network of a change in cell or location (e.g., so long as the UE remains within a list of cells for the RMA). Thus, an inactive UE may move anywhere within the list of cells of the RMA (associated with the multicast data) and continue to receive the multicast data. On the other hand, if an inactive UE moves to a cell that is outside the RMA, the inactive UE may send a message (e.g., such as a connection resume request message, or RRCConnectionResumeRequest) indicating mobility (e.g., movement or change in location or change in cell) for the UE outside of the RMA. This may cause the BS to update the RMA based on the UE mobility to a cell outside the RMA. In order for the UE to determine when the UE should notify the BS or network about a mobility or change in location outside of the RMA, each cell (or one or more of the cells) of the list of cells for the RMA may broadcast the RMA information (e.g., including a RMA identifier (RMA ID) and/or a list of cells for the RMA), e.g., to notify UEs within the cell that the cell is on the list of cells for the RMA. Thus, if an inactive UE moves to a cell outside this list of cells for the RMA, it may then notify the BS or network of its mobility to a new cell outside of the RMA, and the BS or network may adjust (e.g., increase) the size of the RMA to include the new cell where the inactive UE is now located, so that the UE may continue to receive the multicast data associated with the RMA. The adjusted RMA will be available for other UEs receiving the same multicast data based on the RMA information.

Likewise, if a UE that is receiving multicast data transitions from a connected state to a low activity state, the cell where the UE is located (if not already part of the RMA) should be included within the list of cells for the RMA so that the UE may continue to receive the multicast data associated with the RMA. Thus, for a UE that is receiving (or interested in receiving multicast data), a change in state (e.g., from connected state to inactive) and/or mobility (e.g., change in location/cell) for the UE may cause or trigger the BS to adjust the RMA to add the cell where the UE is located to the RMA list of cells so that the UE may receive the multicast data via multicast DRB while in inactive state, for example. Another alternative could be that the BS decides not to extend RMA and configures UE to receive the data using unicast data radio bearer. This could be due to lack of sufficient number of UEs subscribing to the multicast data within a particular cell.

Similarly, a BS may reduce the size of a RMA (e.g., by dropping a cell from the list of cells for the RMA), if a UE unsubscribes to multicast data, or if the mobility results in no UEs in a cell in the list of cells of the RMA that are interested in receiving the multicast data. Or, a cell may be dropped from a RMA if an inactive UE, currently receiving multicast data via multicast DRB, transitions to active state and the BS determines to deliver the multicast data to the UE via unicast DRB (in such case there may be no longer a need to use the multicast DRB for that cell). Or, a cell may be dropped from a RMA if the counting of UEs receiving multicast data via multicast DRB indicated a low number of UEs (e.g., UEs are better served via unicast DRB, for example).

According to an example embodiment, a BS may send a connection suspend message to a UE to cause the UE to transition from connected state to inactive state, e.g., to allow the UE to conserve power. According to an example embodiment, in some cases, if the UE has a low unicast activity (e.g., a decrease in unicast activity, or a unicast activity less than a threshold), then the BS may cause the UE to transition to inactive state to save power. As noted above, a transition of a UE from a connected state to a low activity state, and/or a mobility (or change in location) of the UE outside of the RMA may cause or trigger the BS to update or adjust the RMA (the list of cells for the RMA) to include the cell where the UE is located, e.g., so that the UE may receive and/or continue receiving the multicast data associated with the RMA via the multicast DRB (data radio bearer).

A number of further illustrative example embodiments will now be described.

Various example embodiments may provide multicast content delivery in a dynamic (variable) geographical area (which may grow or shrink based on location and/or state of the UEs that are interested in receiving the multicast content), where different levels of unicast traffic may be supported by unicast UEs. Users/UEs having active unicast traffic may be in a RRC Connected state and since the UE location is known by a single cell, it is up to RAN to decide the multicast bearer configuration, or deliver the multicast traffic over unicast data radio bearers. If the number of active users is low, the multicast traffic is delivered to UEs using unicast. Anchor BS is typically the serving BS, and may include the BS where tunnels from CN are terminated for the multicast data.

According to an example embodiment, when the unicast traffic of a UE is detected to have a low activity (e.g., a decrease in unicast activity by more than a threshold, or a unicast activity that is less than a threshold), the user (UE) may be transitioned by the BS Inactive state including continuation of multicast traffic within the configured RAN based multicast area (RMA). The RMA, where the inactive UE can receive multicast traffic via multicast DRB, may be defined and controlled by RAN (BS) and can be part of the RRC configuration, and/or part of the broadcasted multicast configuration (e.g., System Information, On-demand System Information delivery) or part of dedicated signaling between BS and UE. The anchor BS may typically define the RMA configuration (e.g., a list of cells for the RMA) and distributes it over Xn (BS-to-BS) interface to the BSs/gNBs which may then collaboratively manage the RMA including cells controlled by more than one BS.

According to an example embodiment, the BS may decide to keep one (or more) UEs in a Connected (e.g., RRC_CONNECTED) state (e.g., and such connected UEs receive multicast data via unicast DRB) assuming that multicast bearer mapped to unicast bearer or direct usage of unicast bearer will be more spectrally efficient than multicast bearer in inactive state. The multicast traffic can be configured with a feedback channel for better link adaptation in Connected state.

The gNB can decide to keep one (or more) UEs in low activity (e.g., RRC_INACTIVE) state assuming that UE can be configured with (infrequent) feedback transmission directly from RRC_INACTIVE without transition to RRC_CONNECTED state. This allows the network to adapt the multicast transmission according to the feedback.

The RMA area (list of cells for the RMA) may be dynamically managed over Xn interface between gNBs/BSs, when the RMA includes a list cells belonging to more than one BS/gNB. The UE can receive the multicast traffic and move within RMA without notifying the network, as long as it stays within the given RMA (e.g., RMA Id or RMA list). When UE identifies a better cell outside of the RMA, the UE may indicate the need for RMA update. The UE may perform cell reselection to a new cell. The requested RMA update can be UE specific or a multicast group specific, or can consist of a list of multicast groups. This way, the multicast traffic delivery and RMA management can allow dynamic multicast areas, which are adapted to distribution of UEs in a geographical area.

Figure 2:
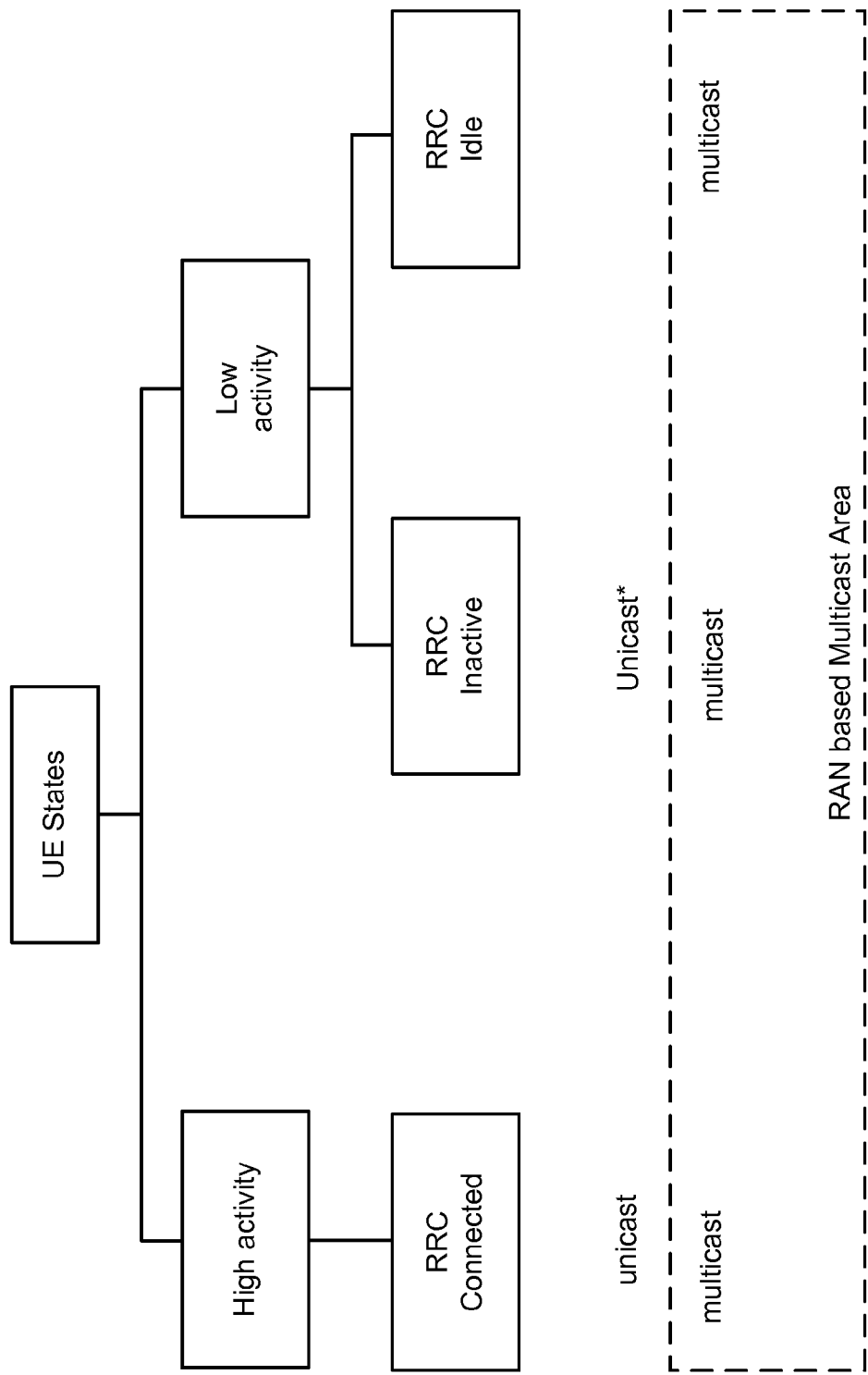
FIG. 2 is a diagram illustrating example UE unicast states for multicast reception in a wireless network with RAN (radio access network) based Multicast Area (RMA) according to an example embodiment.

FIG. 2 is a diagram illustrating example UE unicast states for multicast reception in a wireless network with RAN (radio access network) based Multicast Area (RMA) according to an example embodiment. A UE may be provided in either Connected, Inactive or Idle states. According to an example embodiment, a UE may receive IP multicast traffic in all configured RRC states, as shown in FIG. 2. RAN based Multicast Area (RMA) is defined for the UE joining the multicast session, e.g., IP multicast session. This RMA area can be used for the UE during both high unicast activity and low unicast activity. In a special case where the UE is in RRC_CONNECTED state and there are only one or few UEs receiving the multicast traffic, the UE can be configured to receive the multicast traffic over a unicast data radio bearer and in this case the RMA is not (necessarily) applied or configured for that UE.

A UE with high unicast activity (e.g., unicast activity, which may include sending and/or receiving data via unicast DRB that is greater than a threshold) may be in a Connected state, while a low activity UE may be in either Inactive or Idle states. A low activity UE may be a UE that has a decrease in UE activity greater than a threshold, or unicast activity less than a threshold, for example.

An example difference between the RRC_INACTIVE and RRC_IDLE states is such that UE is assumed to be able to transmit unicast* data infrequently in the RRC_INACTIVE state (e.g., but not in Idle state). The infrequent transmission could consist of messages counting information of interested UEs for receiving multicast traffic, and also include a feedback about multicast reception allowing the network to adapt the multicast transmission according to the feedback. In case of there is an UE in RRC_IDLE state of which the network is aware (i.e., the network decided to release the RRC connection and UE has not done a tracking area update (TAU), the network does not receive any feedback from the UE in RRC_IDLE state. In this case the network may then perform multicast transmission differently, e.g., to select a robust modulation and channel coding ensuring cell coverage or use multi-cell transmission or deliver the same content over the air using synchronized time-frequency physical resources from multiple transmission points.

In one example embodiment, the multicast bearer (e.g., multicast data radio bearer) configured within cell/RMA can be operated independent of the RRC state, e.g., stateless operation or receive only device, meaning that any UE can receive the multicast bearer based on the common configuration with a default multicast bearer. In this case the BS/gNB configures just one multicast bearer. The BS/gNB determines how to configure the multicast bearer based on UEs interested in IP multicast traffic are in RRC_CONNECTED, RRC_INACTIVE and RRC_IDLE, or what is the distribution of UEs in different RRC states.

In another example embodiment, in case where multicast UE population is large, the serving BS/gNB can decide to release RRC (unicast) connections carrying multicast traffic and put those UEs to RRC_INACTIVE or RRC_IDLE, e.g., for those UEs having low unicast traffic. In such a case, the low activity UEs would receive the multicast data via multicast data radio bearer. Cells where any of these UEs (that have transitioned to Inactive or Idle state) are located should be added by the BS to the list of cells for the RMA, to the extent such cells are not already part of the RMA.

Figure 3:
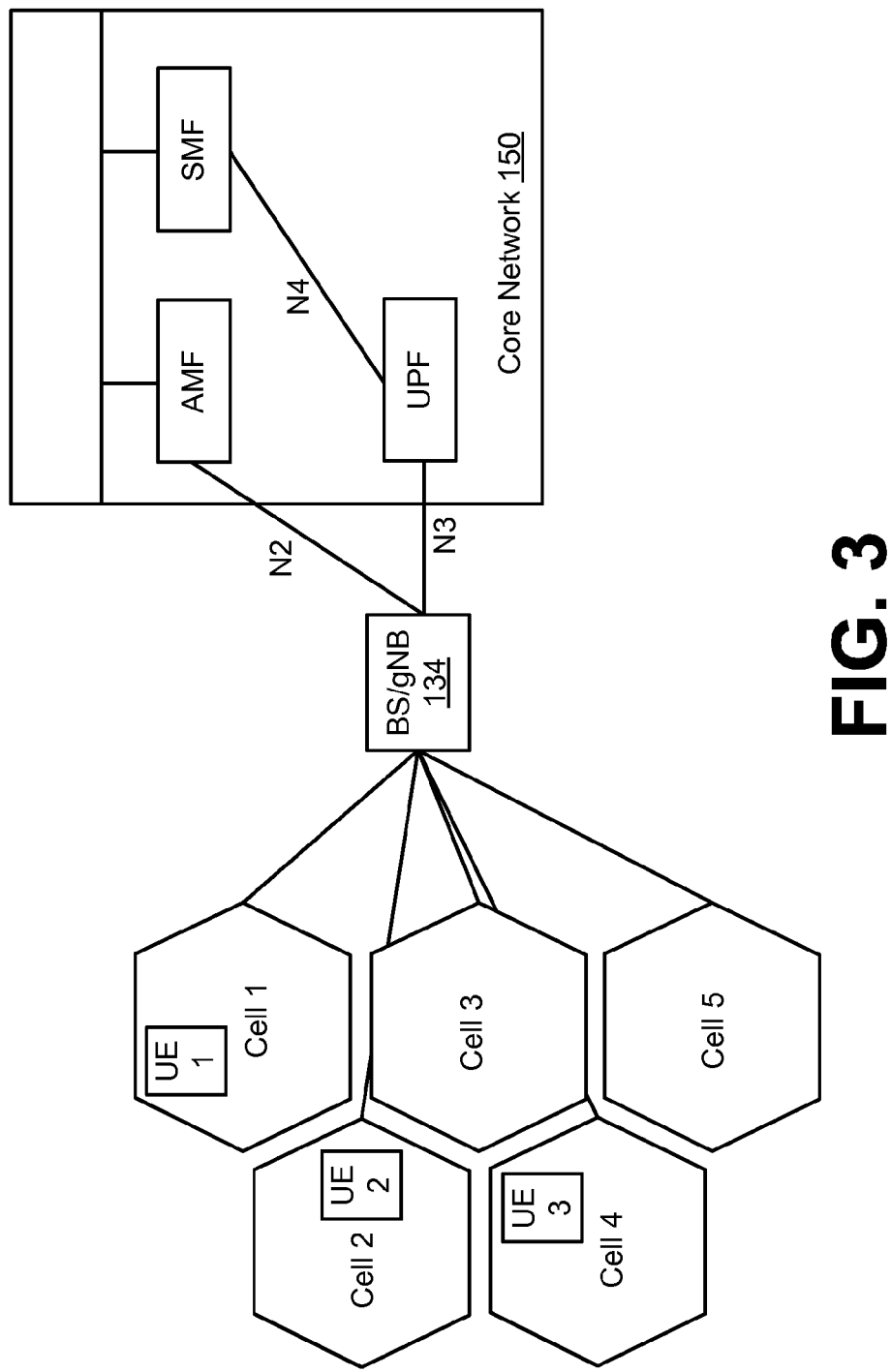
FIG. 3 is a diagram illustrating a network according to an example embodiment.

FIG. 3 is a diagram illustrating a network according to an example embodiment. A core network may include one or more core network functions or blocks, such as: AMF (access and mobility management function, which manages access control and mobility for UEs); SMF (session management function, which sets up and manages sessions according to network policy); and UPF (user plane function, which provide user plane data transmission and control). The core network 150 may also include functions or blocks, not shown. A BS may provide a plurality of cells, including cell 1, cell 2, cell 3, cell 4, cell 5, etc. A group of UEs are shown, including UE 1 (shown as being located in cell 1), UE 2 (shown as being located in cell 2), and UE 3 (shown as being located in cell 4). FIG. 3 merely illustrates an example network, and other cells and/or UEs may be provided and in different arrangements.

According to an example embodiment, a RMA may include an area defined by a set of cells, in which a UE in the RRC_INACTIVE state can move and receive multicast data over a multicast DRB.

Figure 4:
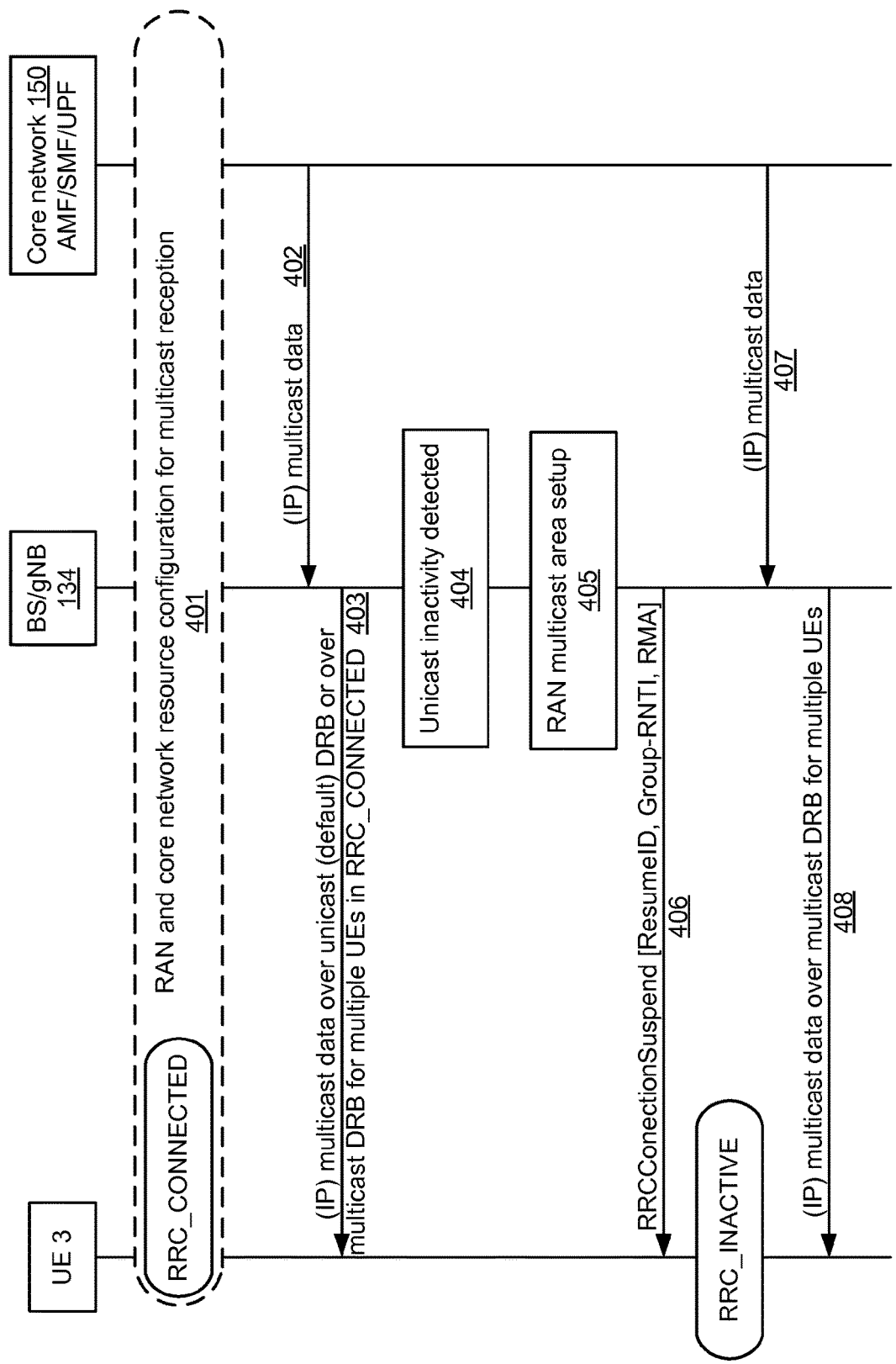
FIG. 4 is a diagram illustrating a procedure of suspending a UE to Inactive state and configuring a RAN multicast area (RMA) according to an example embodiment.

FIG. 4 is a diagram illustrating a procedure of suspending a UE to Inactive state and configuring a RAN multicast area (RMA) according to an example embodiment. FIG. 4 may include a number of steps or operations, including steps 401-408.

401. This step abstracts several steps which may be performed by the BS 134 (and/or core network 150) before the UE suspension to RRC_INACTIVE state and RMA configuration can be performed and may include the following UE joining a multicast group or otherwise expressing its interest to receive multicast data;

Establishment of resources in core network for transport of multicast data which, in case of 3GPP 5G core network, includes a tunnel (e.g., N3 tunnel) terminated at BS/gNB 134;

BS/gNB 134 obtains information about UE's interest in the reception of multicast data. For example, the BS/gNB 134 may obtain the information from the core network for each UE during PDU (protocol data unit) session update procedure;

BS/gNB 134 configures radio resources including at least a unicast (default) DRB and a multicast DRB. The multicast DRB may be shared by multiple UEs which can receive the multicast data over the multicast DRB concurrently.

Referring to FIG. 3, the BS/gNB 134 may have completed the configuration of the three UEs (UE 1, UE 2, UE 3) at this step.

402. The BS/gNB 134 receives the multicast data from the core network 150.

403. The gNB sends the multicast data to all UEs (UE 1, UE 2, UE 3) using the unicast DRB and/or multicast DRB. FIG. 4 illustrates the transmission only to one of the UEs (UE 3) for simplicity. Initially, it may be assumed that UE 3 is in a connected state. Also, the other UEs may also initially be in a connected state.

404. The BS/gNB 134 detects a low unicast activity for the UE 3 (e.g., based on an amount of unicast transmitting or receiving by UE 3 is less than a threshold, or other low unicast activity detection), while the UE 3 continues to have an interest in receiving the multicast data possibly associated with the RMA.

405. The BS/gNB 134 performs RMA setup, e.g., by determining the size of RMA, including determining which cells should be included in or for the RMA. BS/gNB 134 may use in the decision process one or more of the following, by way of example: the knowledge about location of UEs (in which cell the UE is located, which may be determined based on RAN-based notification Area (RNA), or other technique) interested in receiving the multicast data, and a prediction about UE mobility (e.g., expected movement of UEs between cells, based on history of movement by other UEs, for example).

In the example of FIG. 3, the BS/gNB may (as an illustrative example) decide that the RMA comprises all cells that include UEs currently receiving the multicast data (i.e., cell 1, cell 2 and cell 4). However, in this example, it may be assumed that the BS/gNB decides to set up RMA comprising only cell 4 and cell 2 for the purpose of RMA update example later.

406. The BS/gNB 134 sends a connection suspend (e.g., RRCConnectionSuspend) message instructing the UE 3 to enter the RRC_INACTIVE state. The connection suspend message at 406 includes a ResumeID, Group-RNTI (group identifier or group address for the multicast data), RMA (which may include one or more RMA IDs and/or a list of cells for the RMA). The Group-RNTI may be used for the reception of the multicast DRB. In particular, Group-RNTI may be used to for decoding PDCCH (physical downlink control channel) which further provides control information for reception of downlink shared channel carrying the multicast data. The Group-RNTI may already be provided in step 403 and if Group-RNTI in this step 406 has not changed/updated, then this field can be considered as optional (it should not change). The RMA may be represented as a list of cells or as one or more RMA IDs. If the RMA is represented as RMA IDs, then the cells comprising (or included within the) RMA should broadcast the RMA ID, e.g., so that a UE in the RRC_INACTIVE state can receive the RMA ID (e.g., so that each Idle UE receiving (or interested in receiving) multicast data for the RMA (via multicast DRB) will know when it needs to send a message to a BS indicating mobility of the UE to a cell outside of the list of cells for the RMA, which may cause the BS to update the RMA to include the new cell). Upon the reception of the RRCConnectionSuspend message, the UE enters the RRC_INACTIVE state.

407. The BS/gNB 134 receives multicast data from core network 150.

408. The BS/gNB 134 sends the multicast data at least over multicast DRB in (or via) the cells of RMA, e.g., so that UEs (e.g., including UE 3) within these cells may receive the multicast data.

Figure 5:
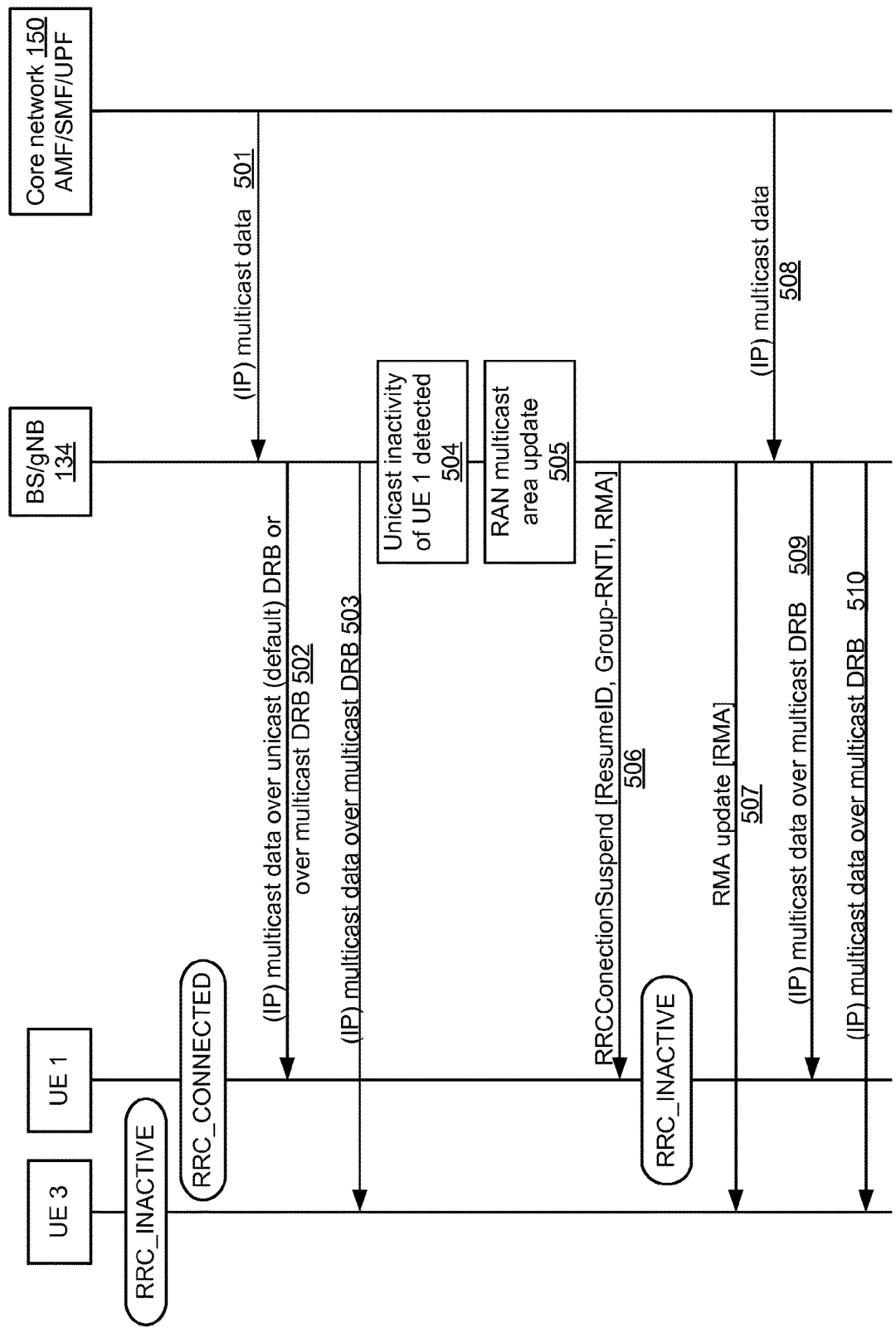
FIG. 5 is a diagram illustrating shows RMA the suspend procedure of a UE in a cell outside the RMA and the RMA update procedure according to an example embodiment.

FIG. 5 is a diagram illustrating shows RMA the suspend procedure of a UE in a cell outside the RMA and the RMA update procedure according to an example embodiment. Following with the example of FIG. 3 and FIG. 4, the BS/gNB 134 already configured the RMA to include cell 4 and cell 2 using the procedure shown in FIG. 4. The necessary configurations for the transmission of the multicast data to UE 1 in cell 1 were also completed. FIG. 5 may include a number of steps or operations, e.g., including steps 501-510. Initially, UE 1 is in a Connected state, and UE 3 is in a low activity state.

501. The BS/gNB 134 receives the multicast data from the core network 150.

502. The BS/gNB 134 sends the multicast data over the unicast DRB or over the multicast DRB to UE 1 in cell 1.

503. The BS/gNB 134 sends the multicast data over the multicast DRB to UE 3 in cell 2 and cell 4 because UE 3 can move freely in the RMA (without needing to notify the BS 134 of mobility or change in cell with respect to the RMA) which currently comprises both cell 2 and cell 4.

504. The BS/gNB 134 detects a low unicast activity or unicast inactivity (for example, which may be detected based on a unicast activity that is less than a threshold) of UE 1 while the UE 1 is receiving the multicast data (also the status of the UE in regard to the interest in the reception of multicast data did not change in the network). The BS/gNB 134 decides that UE 1 is going to be suspended to the inactive (e.g., RRC_INACTIVE) state, e.g., due to the low activity/inactivity of the UE 1.

505. The BS/gNB 134 decides to update the RMA to include cell 1 (e.g., since the UE 1 will be transitioning to Inactive state, and thus can continue receiving the multicast data only through multicast DRB via the RMA; thus RMA should be expanded to include the cell where UE 1 is located to allow UE 1 to continue receiving multicast data via multicast DRB after transitioning to Inactive state).

506. The BS/gNB 134 sends the connection suspend (e.g., RRCConnectionSuspend) message instructing/ordering UE 1 to enter the Inactive (e.g., RRC_INACTIVE) state. The message includes a ResumeID, RMA, where the RMA is represented as a list of cells or as one or more RMA IDs (see step 406 for more details), and the Group-RNTI to allow the UE 1 to receive the multicast data via multicast DRB. Upon the reception of the RRCConnectionSuspend message, UE 1 enters the RRC_INACTIVE state.

507. The BS/gNB 134 may need to send a RMA update depending on how the RMA is represented because the RMA area changed to include cell 1 in addition to cell 2 and cell 4 and UEs already in RRC_INACTIVE state (e.g., UE 3 in the example) can move in the updated RMA without notifying the network. Thus, at 507, the BS 134 may broadcast updated information for the RMA (e.g., to inform UEs within all the cells of the updated RMA, including cells 1, 2 and 4, of the new area for the RMA, which will notify all the UEs where they can move or roam within the RMA without necessarily needing to notify the BS 134 or a new BS of a mobility to a cell outside of the RMA). Thus, if UE 1 moves to cell 4, which is outside the RMA, then UE 1 may then send a message informing the BS 134 (or informing a new BS if cell 4 was provided by a different BS) of UE 1 mobility (e.g., and selection for camping of cell 4) to cell 4, so that BS 134 may update RMA to include such new cell. Likewise, if UE 1 moves from cell 1 to cell 2 (which is already in the RMA), then the UE 1 will not need to notify BS 134 of its mobility, with respect to the RMA, to cell 2. UE 1 knows the area for the RMA based on the broadcast information describing the RMA (e.g., RMA ID(s) and/or list of cells for the RMA).

If the RMA is represented as a list of cells, the BS/gNB 134 can send a control message containing the list of cells constituting the update RMA on a number of different signals or channels, such as, for example: a logical control channel multiplexed with a logical data channel multiplexed on the multicast DRB; or a broadcast control channel dedicated for multicast control; or a broadcast channel used for system information transmission (e.g., via SIB or system information block transmission).

If, for example, the RMA is represented as a list of RMA IDs and a new RMA ID (covering the area of cell 1) is added to the list for cell 1, then the BS/gNB 134 may act as if the RMA is represented as a list of cells.

If, for example, the RMA is represented by a single RMA ID or if the RMA is represented as a list of RMA IDs but the list did not change due the update of RMA, then the BS/gNB 134 may update the broadcast information in cell 1 to include RMA ID and the BS/gNB does not need to send the RMA update to UEs.

The transmission of the RMA update message at 507 may be repeated to increase the likelihood of successful reception by UEs interested to receive the multicast data. However, the BS/gNB does not need to repeat this information continuously during the time the multicast data transmission is ongoing (

508. The BS/gNB 134 receives multicast data from core network 150.

509. and 510. The BS/gNB 134 sends multicast data in the cells of RMA using at least the multicast DRB. There may be UEs in the RRC_CONNECTED state in the cells of RMA to which the BS/gNB 134 may send the multicast data using unicast DRB.

Figure 6:
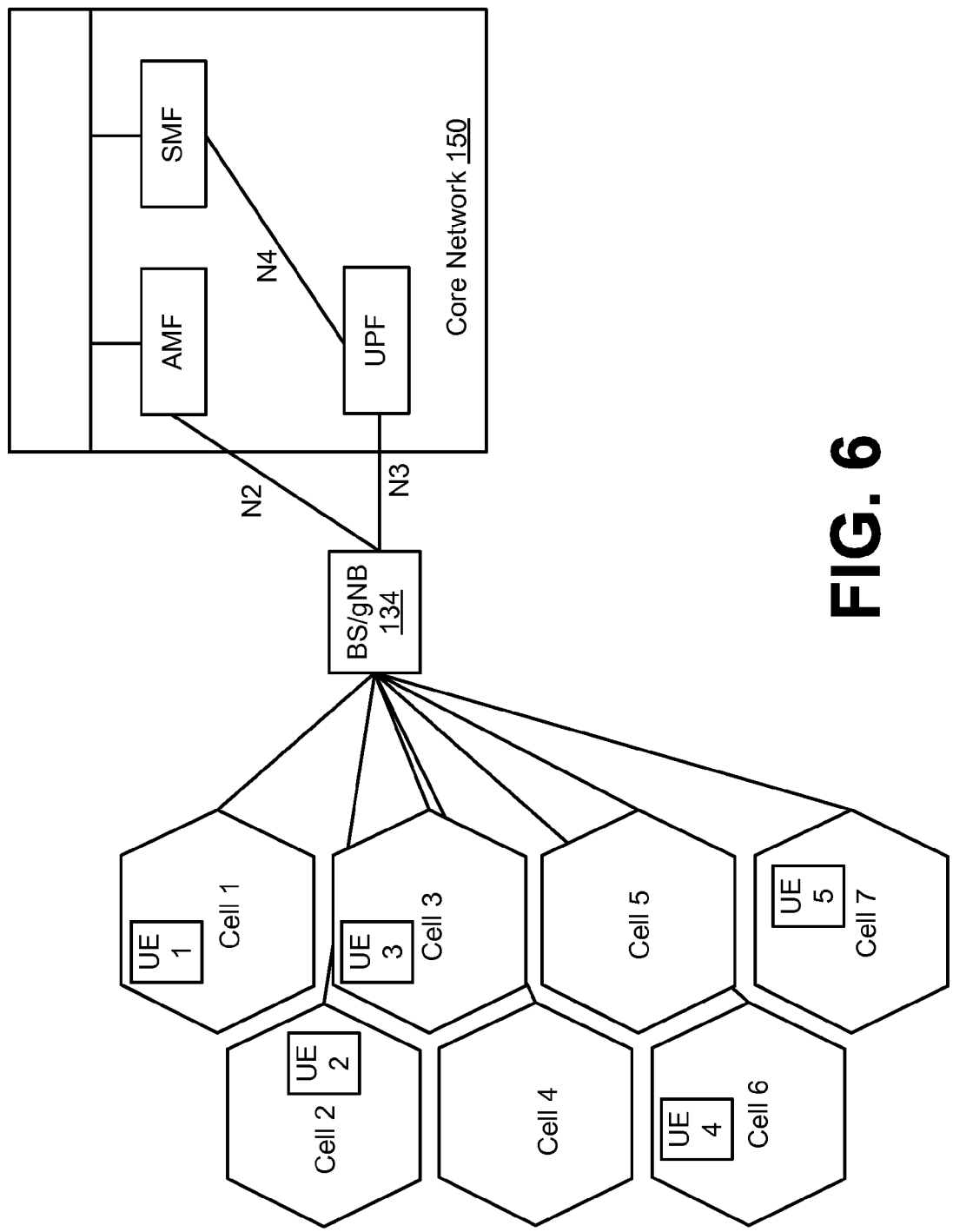
FIG. 6 is a diagram illustrating a network according to another example embodiment.

FIG. 6 is a diagram illustrating a network according to another example embodiment. Five UEs are shown in FIG. 6 (UE 1, UE 2, UE 3, UE 4, and UE 5). All UEs have sent to BS 134 a request to receive multicast data associated with the RMA. The BS has determined RMA configuration, or list of cells for the RMA as: RMA={cell 2, cell 3, cell 6, cell 7}. In this example, cell 1 is not part of RMA, although the multicast data is sent to UE 1 in the cell 1, because the base station (gNB) 134 decided that the multicast DRB is not always used. The BS/gNB may switch between the unicast and the multicast DRBs for UE 1 and possibly other UEs (not shown in FIG. 6) which are in RRC_CONNECTED state in cell 1. The reception of multicast data in cell 1 via the multicast DRB is not guaranteed because of the switching, in this example. Therefore, UE 2 and UE 3, which are in the RRC_INACTIVE state, cannot move to cell 1 and continue receiving the multicast data (because cell 1 is not part of RMA). The following assumes that the BS/gNB sends RMA information to UEs as a list of cells. In this example, it can be seen that the RMA is a discontinuous (or noncontiguous) group of cells, because cell 2 and 3 are adjacent or continuous, but are not adjacent to cells 6 and 7. The base station 134 may send only partial information about RMA, i.e., RMA_part1={cell 2, cell 3} to UE 2 and UE 3, because UE 2 and UE 3 cannot move to cell 4 or cell 5 without notifying the BS/gNB about moving (mobility) to a cell outside RMA (because such UEs, in order to move to cells 6 or 7 that are within RMA, would need to pass through a cell (e.g., cell 4 or cell 5) that is not part of the RMA. Likewise, BS 134 may only send RMA_part2={cell 6, cell 7} to UE 4 and UE 5 because UE 4 and UE 5 cannot move to cell 2 or cell 3 (which are within the RMA) without notifying the BS/gNB about moving (mobility) to a cell outside RMA (because such UEs, in order to move to cells 2 or 3 that are within RMA, would need to pass through a cell (e.g., cell 4 or cell 5) that is not part of the RMA. The BS/gNB 134 does not send multicast data via the multicast DRB in cell 4 and cell 5. Thus, a RMA may a set of noncontiguous or non-adjacent cells. In such case, the BS may broadcast only a subset of the list of cells of the RMA within each cell. Alternatively, the BS may broadcast the full list via all cells of the RMA, even though some of such cells may noncontiguous or discontinuous.

Example update scenario 1: The BS/gNB 134 detects the unicast inactivity or low unicast activity of UE 1. The BS/gNB 134 decides to suspend UE 1 to the RRC_INACTIVE state, and adds cell 1 to the RMA (if not already part of the RMA). The BS/gNB 134 sends RRCConnectionSuspend message to UE 1 including RMA_part={cell 1, cell 2, cell 3}. The BS/gNB sends also update (see step 507) to UE 2 and UE 3 with RMA_part={cell 1, cell 2, cell 3}. RMA is now RMA={cell 1, cell 2, cell 3, cell 6, cell 7}.

Example update scenario 2: All UEs are in RRC_INACTIVE. RMA={cell 1, cell 2, cell 3, cell 6, cell 7}. RMA sent to UE 1, UE 2, UE 3 is RMA_part={cell 1, cell 2, cell 3}. RMA sent to UE 4 and UE 5 is RMA_part={cell 6, cell 7}. UE 3 moves towards cell 4 and signaling related to (or indicating) mobility outside RMA is triggered. The UE 3 is still inactive or low unicast activity from the unicast point of view. The BS/gNB 134 suspends UE 3 to RRC_INACTIVE by sending RRCConnectionSuspend including updated the RMA={cell 1, cell 2, cell 3, cell 4, cell 6, cell 7}. UE 1, UE 2, UE 4 and UE 5 are updated as per step 507. Please note, cell 1, cell 2 and cell 3 should be included in RMA because UE 1 and UE 2 could be anywhere in cell 1, cell 2 or cell 3 at this time. In an example embodiment, if BS 134 confirms that no UE interested in receiving the multicast data is within a specific cell (e.g., cell 3), then this cell may be dropped from the RMA, at least in some cases.

Figure 7:
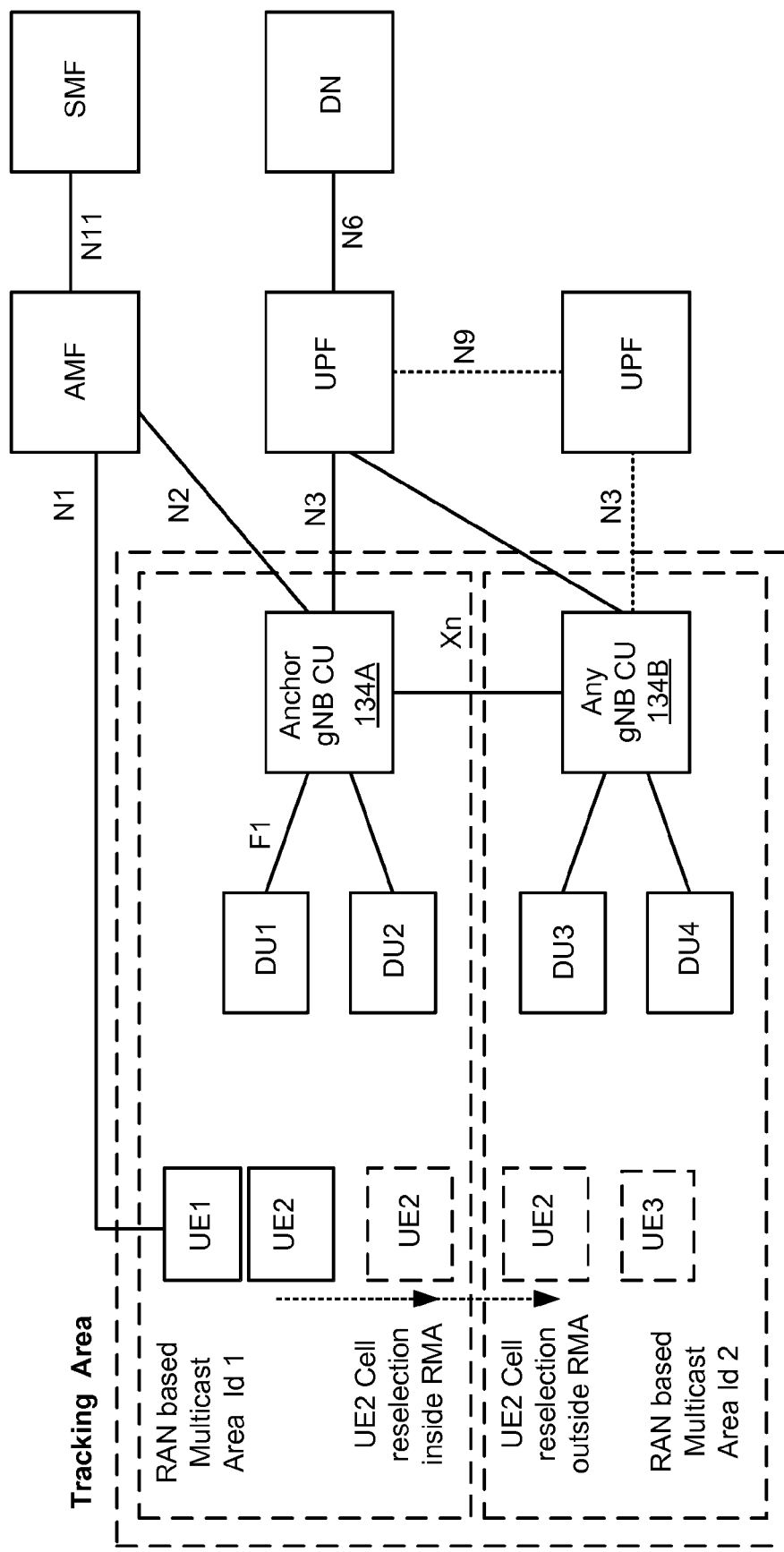
FIG. 7 is a diagram illustrating a network that illustrates two mobility situations for a UE.

FIG. 7 is a diagram illustrating a network that illustrates two mobility situations for a UE. In one example situation, a user device/UE (e.g., UE 2) may move to a cell within the RMA to a new cell, which would not require the UE 2 to inform the BS of the mobility to the new cell via cell reselection (since this does not trigger an update to the RMA). In a second situation, the UE (UE 2) moves or performs cell reselection to a cell that is outside the RMA, which requires the UE to inform the BS of its movement or mobility to a cell outside the RMA, and this may trigger the BS to add the new cell to the RMA, e.g., to allow the UE 2 to continue receiving multicast data via multicast DRB.

In this example of FIG. 7, a BS 134A (e.g., anchor) BS centralized unit CU may be connected to distributed units DUs, e.g., DU1 and DU2, where each CU may include PDCP (packet data convergence protocol entity) and DU may include RLC (radio link control entity), MAC (media access control entity) and PHY (physical layer entity) and an antenna for providing one or more cells, for example. Also, for example, two RMAs are shown, including RMA 1 (with RMA ID 1) that may include cells provided by BS 134A and DU1 and DU2, while RMA 2 may include cells provided by BS 134B and DU3 and DU4, for example.

FIG. 7 illustrates an example 5G RAN logical architecture with two RMAs, including three UEs (UE 1, UE 2, and UE 3) receiving IP multicast traffic. This can be further described with three illustrative examples (Examples 1, 2 and 3).

Example 1. Based on FIG. 2, as an example, UE 1 may be in RRC_CONNECTED state receiving both unicast and PTM (point to multipoint) multicast traffic from the same DU. Location of UE 1 is known by a single cell in RAN (radio access network), thus enabling the transmission of unicast and multicast traffic using unicast bearers and/or multicast bearers.

Example 2. The UE 2 has completed its (or most of its) unicast traffic, and due to low unicast activity (e.g., unicast activity below a threshold), the RAN (e.g. anchor BS/gNB 134A) decides to suspend the UE 2 into RRC_INACTIVE state. The multicast traffic will move from unicast DRB to multicast DRB thus allowing the UE 2 to continue the reception of PTM multicast traffic via multicast DRB. The configuration includes the configuration for RRC_INACTIVE state as well as the PTM Group-RNTI and RMA Id of the RMA that includes at least one cell. The anchor BS 134A receives the PTM multicast traffic over the N3 data tunnel from UPF. When the UE 2 identifies a new cell with better quantity or quality of coverage and optionally the current source cell is having degrading coverage/quality quantities, UE needs to perform a cell reselection to new cell. In FIG. 7, two cases with UE mobility can be identified for UEs in RRC_INACTIVE state.

a. The UE2 moves within the RMA Id1 and performs cell reselection from one DU1 to another DU2. The UE2 does not need notify the network about cell reselection since it is able to receive the same multicast traffic from all transmission points under the same RMA (e.g., because cells provided by both DU1 and DU2 are part of RMA ID1). The RMA can consist of one or more BSs and the UPF traffic is distributed over F1, Xn and N3 interfaces to transmission points to cover the RMA area. Further, if the RMA consists of multiple BSs contributing to multi-cell Point-to-Multipoint (MC-PTM) transmission, then the F1, Xn (synchronization information can be controlled by BS receiving the IP multicast traffic over N3) and N3 (synchronization information received from CN, e.g. SYNC protocol) interfaces can be used to route the same IP multicast traffic to joining BSs/gNBs.

b. If the new target cell (e.g., a cell provided by either DU3 or DU4) is outside of the RMA Id1, UE needs to notify the network its new location with RMA update, or with information of its mobility to a cell outside of the RMA Id1. In this illustrative example, the network (which may include one or more BSs) will configure the UE with new RMA Id (RMA Id2) and if the new RMA (RMA Id2) consists of more than one BS, network performs the RAN based Multicast Area Setup to allow traffic distribution from anchor BS over Xn to BSs belonging to the new RMA for RMA Id2.

3. The UE 3 is having low unicast activity/unicast inactivity (e.g., unicast activity less than a threshold) and is configured with RRC_IDLE state. Network knows the UE's location only within the tracking area in AMF. UE 3 could be also a receive only device with no uplink capability. In this case the RMA, which becomes the same as the tracking area, may be configured with multiple cells participating in Single Frequency Network (SFN) broadcast, which could be deployed using for example the FeMBMS according to 3GPP Release 14. This option is listed here mainly to complete the overall 5G multicast scenario, or to provide a fuller range of options.

Figure 8:
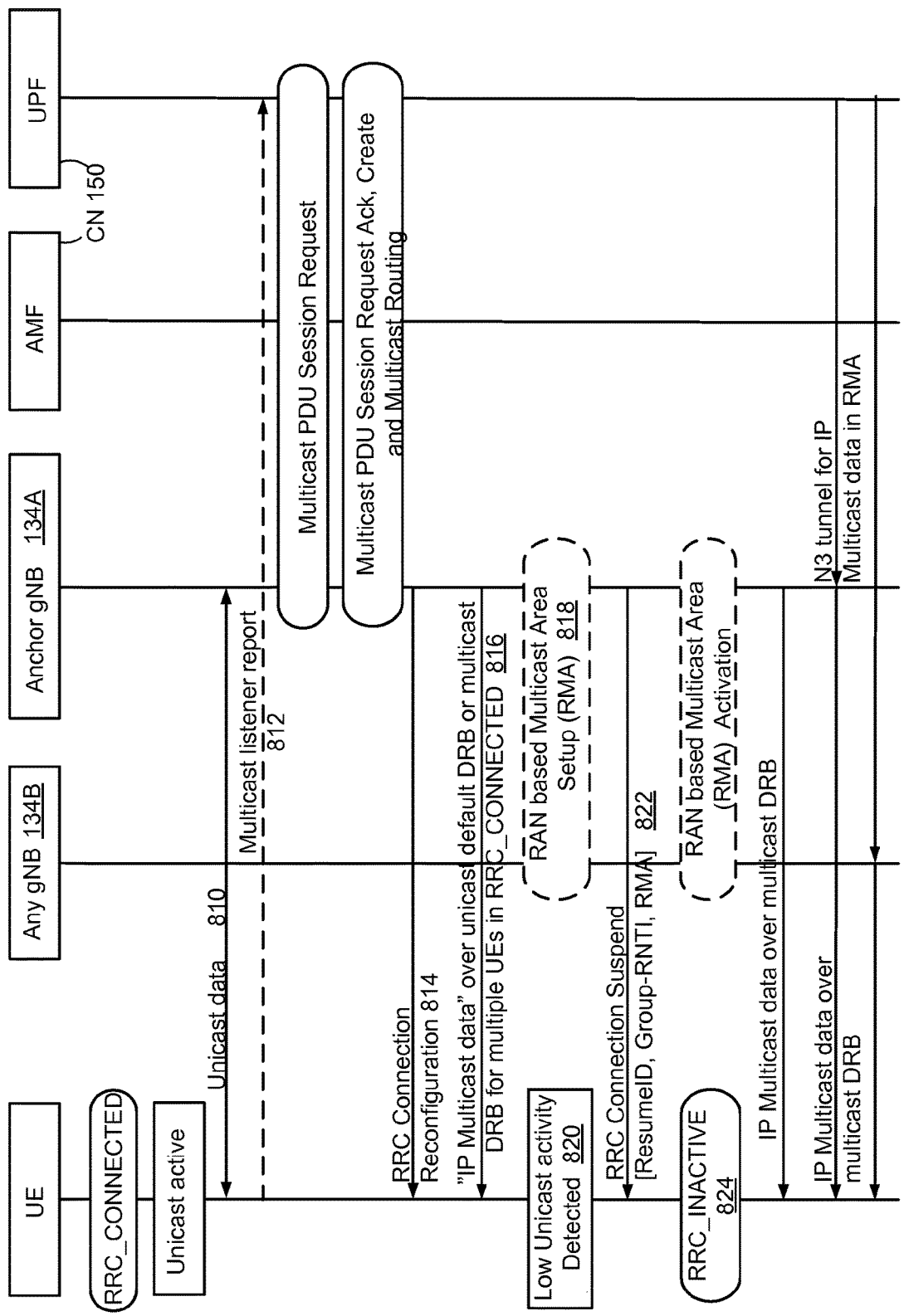
FIG. 8 is a diagram illustrating operation of a network corresponding to example 2b above, where a UE is receiving multicast traffic in a Connected state and further receiving multicast traffic with low unicast activity in a low activity state.

FIG. 8 is a diagram illustrating operation of a network corresponding to example 2b above, where a UE is receiving multicast traffic in a Connected state. The core network (CN) 150, an anchor BS 134A, and another BS 134B and a UE are in communication. IP multicast session is configured and enabled even if the UE is the only device joining the session. RAN (e.g., anchor BS 134A) decides on how to deliver the multicast traffic to UE. RAN (e.g., anchor BS 134A) can select to deliver the IP multicast data over a unicast DRB or over a multicast DRB. The unicast DRB may be a default DRB which is used also for unicast traffic for which a dedicated DRB is not configured. The unicast and multicast channels multiplexed on the default DRB are identified by logical channel identities at MAC layer. The unicast DRB may be also a unicast DRB configured exclusively to convey PTM multicast traffic. There can be multiple UEs receiving the same multicast content in RRC_CONNECTED state and in this case the multicast configuration including the group-RNTI is shared among joining UEs as part of their RRC configuration.

Thus, at 810, multicast data may be transmitted to/from the UE. And, at 812, a multicast listener report is transmitted by the UE to the CN 150, e.g., in which the UE provides a join request to join (or receive multicast data for) a multicast group. CN 150 may then allocate resources for this multicast group. In this manner, the UE may join a multicast group, which may be associated with a RMA. And, at 814, the BS 134A configures unicast DRB and multicast DRB for the UE. And, at 816, the UE receives the multicast data over either unicast DRB or multicast DRB. At 818, BS 134A determines RAN based multicast Area (RMA) setup, in which the BS 134A may determine which cells are part of the RMA for this multicast data.

Further in FIG. 8, at 820, eventually the unicast traffic is completed, thus, anchor BS 134A detects a low unicast activity, and at 822, the network/BS 134A configures the UE to RRC_INACTIVE state with uninterrupted multicast traffic reception. RAN configures the RMA using RAN based Multicast Area Setup procedure and activates the RMA to suspended UE(s). The connection suspend message at 822 may include group address or group identifier (e.g., Group-RNTI) for the multicast data to allow the UE to receive the multicast data, and the RMA (e.g., including the RMA ID and/or a list of cells that are included for the RMA). At 824, the UE transitions to Inactive state. And, then, the UE receives multicast data via a multicast DRB. Here a multicast DRB may include or may indicate a DRB that may be used to transport data to multiple users/UEs.

RRC connection reconfiguration—radio bearers are configured including unicast and multicast data radio bearers. In this example of FIG. 8, multicast data is initially transmitted to the UE over a unicast DRB, but the BS/network may select how to deliver the multicast signal to a connected UE, via either unicast DRB or multicast DRB. Once the UE transitions to inactive state, the RMA should be updated, if necessary, to include the cell where the UE is located, and the UE may receive the multicast content via multicast DRB, e.g., since unicast transmission is not available to UE in inactive state. RMA setup may include where the anchor BS can exchange/provide a list of cells to other BSs, where the multicast group content is provided (within the RMA). Anchor BS may broadcast a message to the cells of the RMA identifying the RMA (RMA ID and/or list of cells of the RMA).

Figure 9:
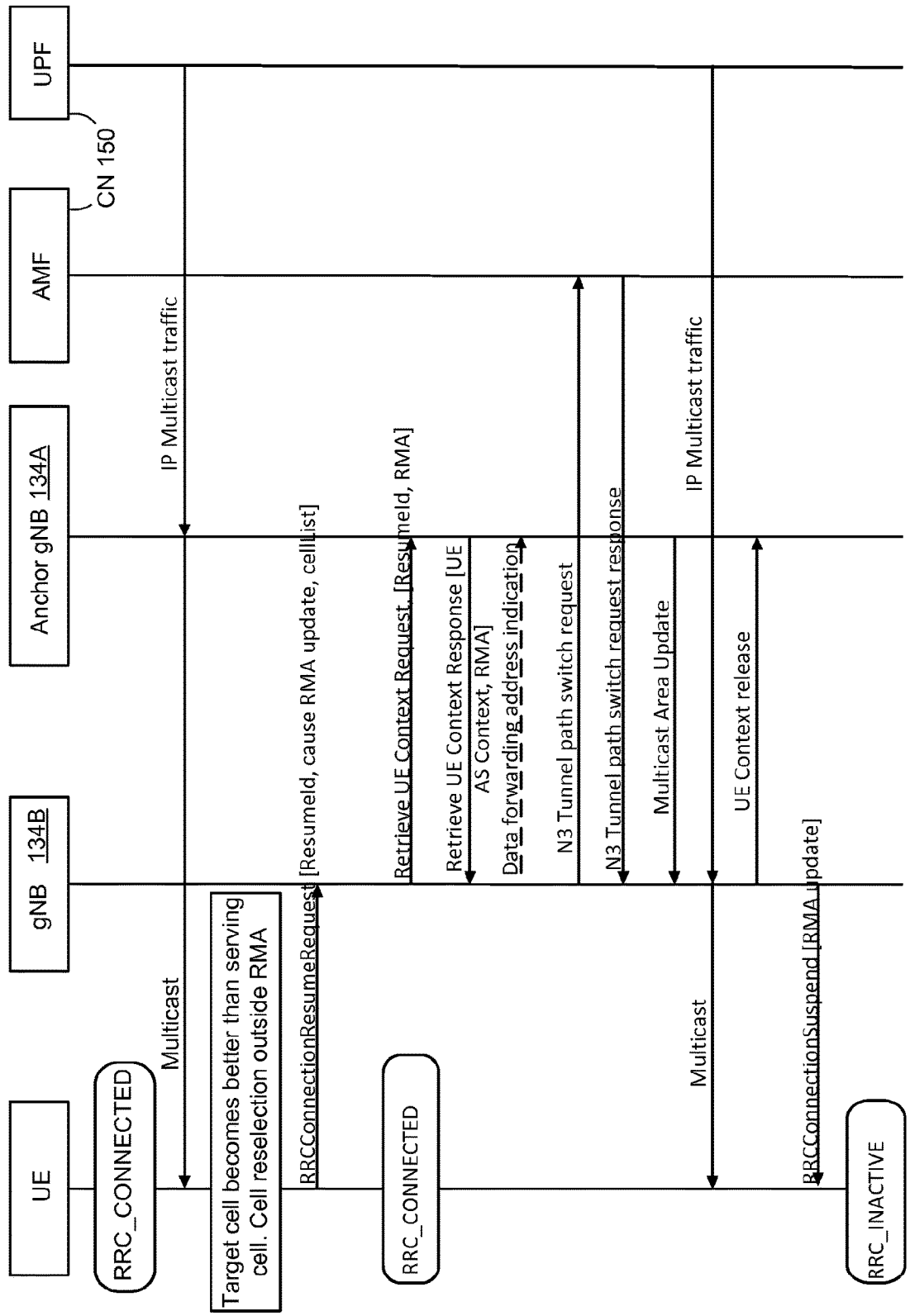
FIG. 9 is a diagram illustrating operation of a network according to another example embodiment.

FIG. 9 is a diagram illustrating operation of a network according to another example embodiment. FIG. 9 details the procedure of UE moving between configured RMAs, e.g. from RMA1 to RMA2 according to FIG. 7. In this example signaling flow, the UE is in RRC_INACTIVE state receiving multicast traffic in RMA1. Due to mobility or radio propagation reasons, the UE measures one of the neighboring cells in RMA2 to be better than current serving cell (offset, threshold). In FIG. 9, the RMA update procedure is triggered towards the new target cell after the cell reselection procedure in RRC_INACTIVE state. The procedure starts with the e.g.

RRCConnectionResumeRequest indicating the UE Resume Id, cause (RMA update), or cause of mobility to outside of RMA, and optionally list of measured cells.

After the UE Context relocation and N3 tunnel path switch, the multicast traffic is delivered using RMA2 and UE is suspended back to RRC_INACTIVE. Network can decide to reconfigure the RMA2 according to UE reported cells and for example add one or more of those cells into RMA2.

One example: UE moves outside of RMA ID1, and assume it was last UE on this BS; anchor BS receives resume ID (connection request), the anchor BS responds that it does not need to handle this RMA because this UE is last UE in its cell for this RMA (no other UEs in this RMA), and gives full control to new BS (which will be new anchor BS for this UE, and may configure RMA as it sees fit); by providing RMA update—this updates UEs via cells within RMA.

As another example, new BS (that receives RRC connection resume request from UE) provides RMA ID to Anchor BS in context request to inform anchor BS that UE has moved outside of RMA ID1, and RMA ID1 may disappear or change, and result of that operation is provided back to new BS via retrieve UE context response (RMA ID1). RMA ID1 could be just be RMA ID, or ID and list of cells. If it sends only RMA ID1, then changes will be transparent; RMA may be listed as a list of cells, and the anchor BS may provide the updated list of cells for this RMA ID1;

It is possible to expand RMA ID1 to include the new cell; or new BS could create a new RMA (RMA ID2) to provide multicast group content that is for RMA ID2).

Figure 10:
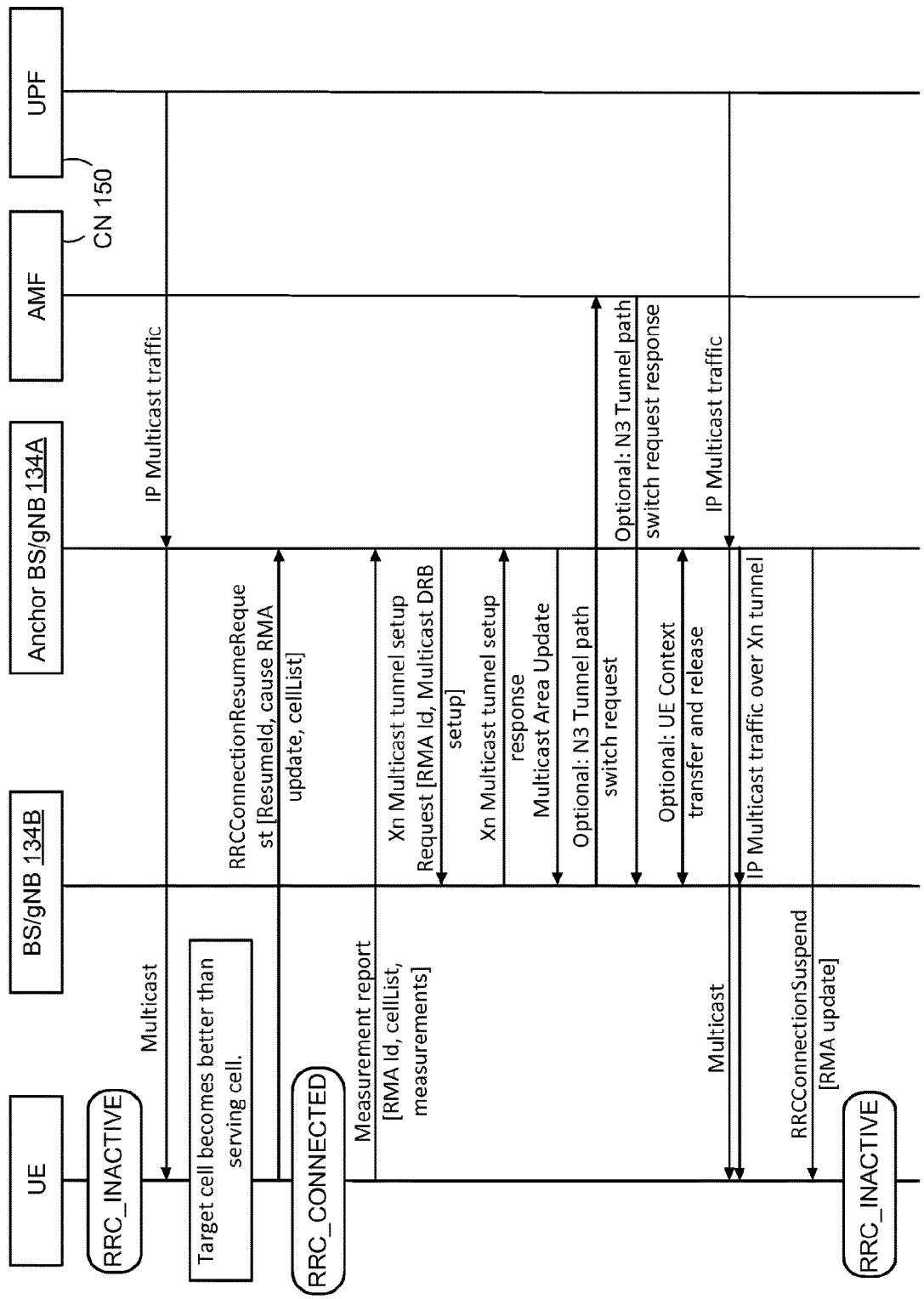
FIG. 10 is a diagram illustrating another network according to another example embodiment.

FIG. 10 is a diagram illustrating another network according to another example embodiment.

A similar RMA procedure as in FIG. 9 is presented in FIG. 10 except that the RMA is updated by the anchor serving cell/anchor BS 134A after the UE has been configured with RRC_CONNECTED state for measurement reporting. The RMA update procedure will contain the cells selected by the network, e.g. based on the measurement report from UE. It is noted that the anchor BS 134A may decide not to relocate the N3 tunnel, but distribute the traffic over Xn interface to new BS/gNB 134B in the RMA. Further, the network may (i) keep the same UPF session and N3 interface, (ii) relocate the UPF and N3 to new gNB, or (iii) duplicate the UPF instance and forward the multicast traffic to new UPF using N9 interface.

When the last serving BS/gNB receives IP Multicast data from the UPF while the UE is in RRC_INACTIVE, it forwards the data to the cells corresponding to the RMA, or in case of multi-BS/gNB operation, using Xn interface.

When the UE is detected to be in low activity state, the RRC connection is inactivated using the RRC Inactivation or RRC Suspend procedure, for example. This procedure will include the necessary information for UE to continue receiving the IP Multicast traffic. The AMF can provide to the last serving BS/gNB the RRC_Inactive Assistance Information (RIAI) to assist the decision whether the UE can be sent to RRC_INACTIVE to receive multicast traffic. The RIAI includes the registration area configured for the UE, the UE specific DRX, Periodic Registration Update timer, an indication if the UE is configured with Mobile Initiated Connection Only (MICO) mode by the AMF, and UE Identity Index value. The UE registration area may be considered by the RAN node when configuring the RMA.

Any UE state can be configured with an RMA, where the RMA can cover a single or multiple cells under one or more gNB. There can be many different alternatives on how the RMA can be configured. An UE can be configured with an explicit list of cells (at least one cell) that constitute the RMA. Cells can broadcast their RMA Id and UEs are configured with a list of supported RMAs. The overall RMA can consist of list of RMAs.

The RMA update procedure enables dynamic multicast traffic areas based on the precise UE location or geographical distribution of UEs. If the UEs receiving the same multicast traffic stay within the same set of RMA cells, the network may shrink the list of areas/cells assigned to the UEs. For example, when a UE has moved, the network has increased the RMA, but when the UEs becomes stationary then the network updates the UE with a RMA list with just one cell or cells under the same gNB. To assist this procedure, the network can provide to the UE a periodic RMA update timer, which indicates the need for RMA update (area reduction).

In one embodiment of the invention, the selection of unicast or multicast radio bearers is based on the availability of UE measurements and the reported quantities in the measurements, such as SINR, RSSI, RSRP, RSRQ or BLER. For example, if measurements are not available, (R)AN is using multicast bearers. In other example, reported quantities may indicate poor radio condition for some UEs in comparison to others, which may lead to selection of unicast bearers for some UEs and multicast bearers for other UEs. For radio links using beam forming, the measurement reports may be received on a beam level, in which case, (R)AN may also utilize reported beam information in the selection process of the radio bearer. The measurement reports can contain location and time information associated with the radio measurements which in turn can be used in the selection process. The selection profile can depend on the QoS profile of the traffic, and network can schedule traffic over multicast/broadcast (for traditional broadcast services). Network can prioritize unicast over multicast for high-quality immersive content type of traffic if there are available radio resources and sufficient quality links to each UE subscribing to the traffic.

Some example advantages may include one or more of:

Using the described RMA procedure, the N3 tunnel, which is used to receive multicast traffic (e.g. data sent to one IP multicast group) from UPF, can be terminated at the anchor NG-RAN node and the NG-RAN can decide the best way to deliver the multicast traffic to any given number of UEs using one or more transmission points.

The method supports well the NG-RAN logical architecture and allows dynamic distribution of traffic over areas based on the Multicast Listener Reports. This is a very significant simplification and enables flexibility in comparison to eMBMS.

Dynamic RMAs allow better distribution of multicast traffic over the NG-RAN and CN interfaces.

The switching between unicast and multicast can be performed at the NG-RAN which is transparent to AMF/UPF. This allows efficient usage of radio resources.

This is method comes with minimal overhead over the unicast architecture and at the same time is a simple and efficient way to deliver IP multicast traffic in NG-RAN.

A number of illustrative example embodiments will be described.

Figure 11:
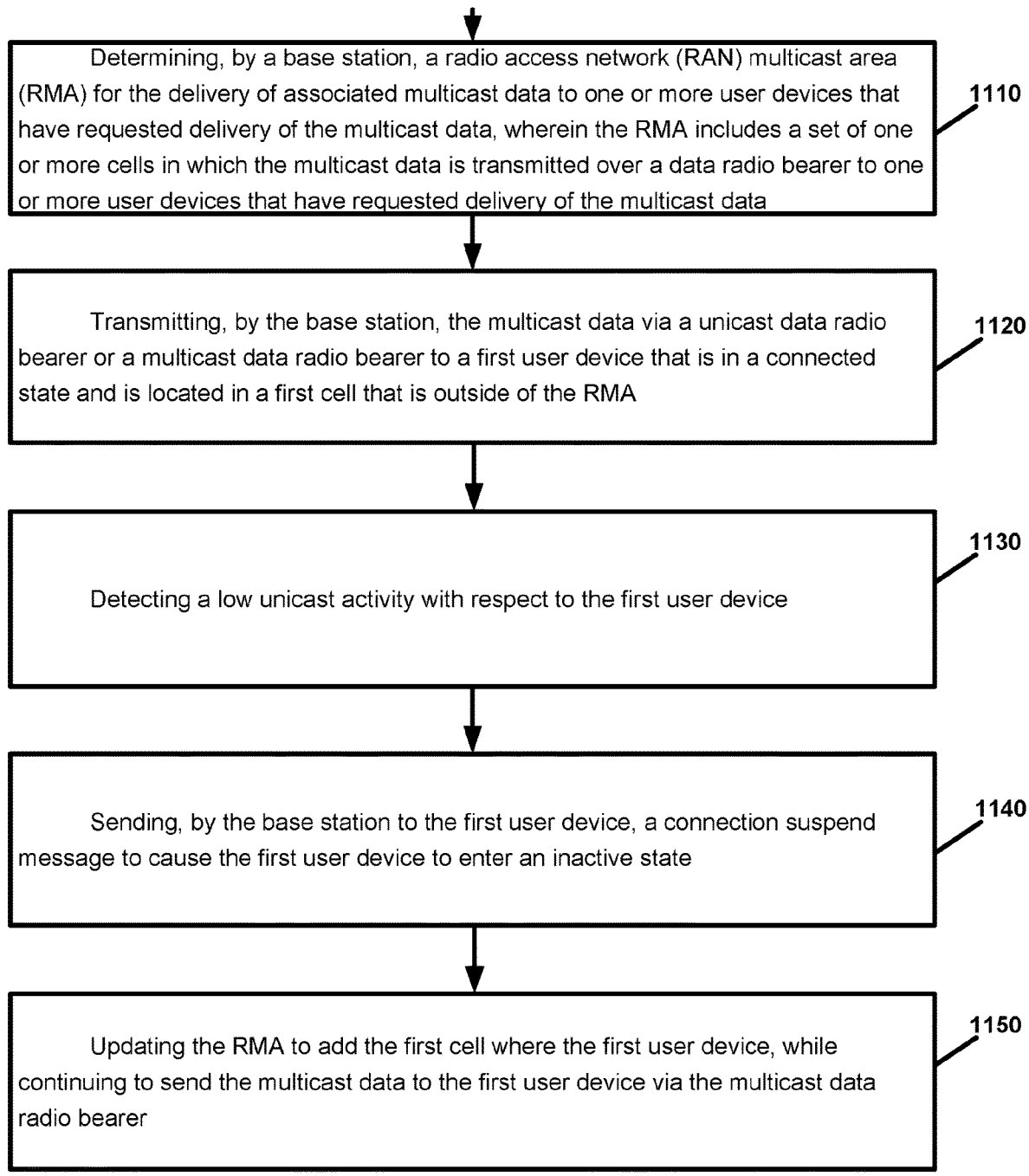
FIG. 11 is a flow chart illustrating operation of a base station according to an example embodiment.

Embodiment 1: FIG. 11 is a flow chart illustrating operation of a user device according to an example embodiment. Operation 1110 includes determining, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data. Operation 1120 includes transmitting, by the base station, the multicast data via a unicast data radio bearer or a multicast data radio bearer to a first user device that is in a connected state and is located in a first cell that is outside of the RMA. Operation 1130 includes detecting a low unicast activity with respect to the first user device. Operation 1140 includes sending, by the base station to the first user device, a connection suspend message to cause the first user device to enter a low activity state. And, operation 1150 includes updating the RMA to add the first cell where the first user device, while continuing to send the multicast data to the first user device via the multicast data radio bearer.

Embodiment 2: According to an example embodiment of embodiment 1, and further comprising: transmitting, by the base station via the set of one or more cells of the RMA, information describing the RMA, including a RMA identifier and/or information identifying the set of one or more cells of the RMA.

Embodiment 3: According to an example embodiment of any of embodiments 1-2, and further comprising: transmitting, by the base station via the multicast data radio bearer, the multicast data to the one or more user devices that are located within the one or more cells of the RMA and have requested delivery of the multicast data.

Embodiment 4: According to an example embodiment of any of embodiments 1-3, wherein the transmitting the multicast data comprises: transmitting, after the updating the RMA to add the first cell to the RMA, via the multicast data radio bearer, the multicast data to first user device via the first cell that is now part of the RMA.

Embodiment 5: According to an example embodiment of any of embodiments 1-4, wherein the connection suspend message comprises one or more of the following: information describing at least a portion of the RMA, including a RMA identifier and/or information identifying at least a portion of the set of one or more cells of the RMA; and a group identifier associated with the multicast data and the RMA, the group identifier to be used by a user device to obtain control information for reception of a downlink channel and/or physical radio resources carrying the multicast data.

Embodiment 6: According to an example embodiment of any of embodiments 1-5, and further comprising transmitting, by the base station via the set of one or more cells of the RMA, information describing the updated RMA, including at least information identifying an updated set of one or more cells of the RMA, including information identifying the first cell that was added to the RMA.

Embodiment 7: According to an example embodiment of any of embodiments 1-6, and further comprising: receiving, by the base station via a second cell that is outside of the RMA from a second user device that is one of the one or more user devices that have requested delivery of the multicast data, a connection request indicating mobility of the second user device outside of the RMA; updating the RMA to add the second cell where the second user device is located to the RMA; and continuing to transmit the multicast data to the one or more user devices via the multicast data radio bearer and via the set of one or more cells of the RMA, including continuing to transmit the multicast data to the second user device via the second cell.

Embodiment 8 According to an example embodiment of any of embodiments 1-7, and further comprising: receiving, by the base station via a first cell that is inside of the RMA from a third user device that is one of the one or more user devices that have requested the delivery of the multicast data, a connection request to cause the base station and the third user device to resume connectivity between the base station and the third user device and enter a connected state; receiving, by the base station a measurement report comprising one or more of the following: measurement results of neighboring cells, cell ID information; updating the RMA to add one or more neighboring cells; and continuing to transmit the multicast data to the one or more user devices via the multicast data radio bearer and via the set of one or more cells of the RMA, including continuing to transmit the multicast data to the third user device via the first cell and the neighboring cell that was added to the RMA.

Embodiment 9: An apparatus comprising at least one processor and at least one memory including computer instructions, when executed by the at least one processor, cause the apparatus to: determine, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data; transmit, by the base station, the multicast data via a unicast data radio bearer or a multicast data radio bearer to a first user device that is in a connected state and is located in a first cell that is outside of the RMA; detect a low unicast activity with respect to the first user device; send, by the base station to the first user device, a connection suspend message to cause the first user device to enter a low activity state (e.g., Inactive state or RRC_Inactive state); and update the RMA to add the first cell where the first user device is located to the RMA, while continuing to send the multicast data to the first user device via the multicast data radio bearer.

Figure 12:
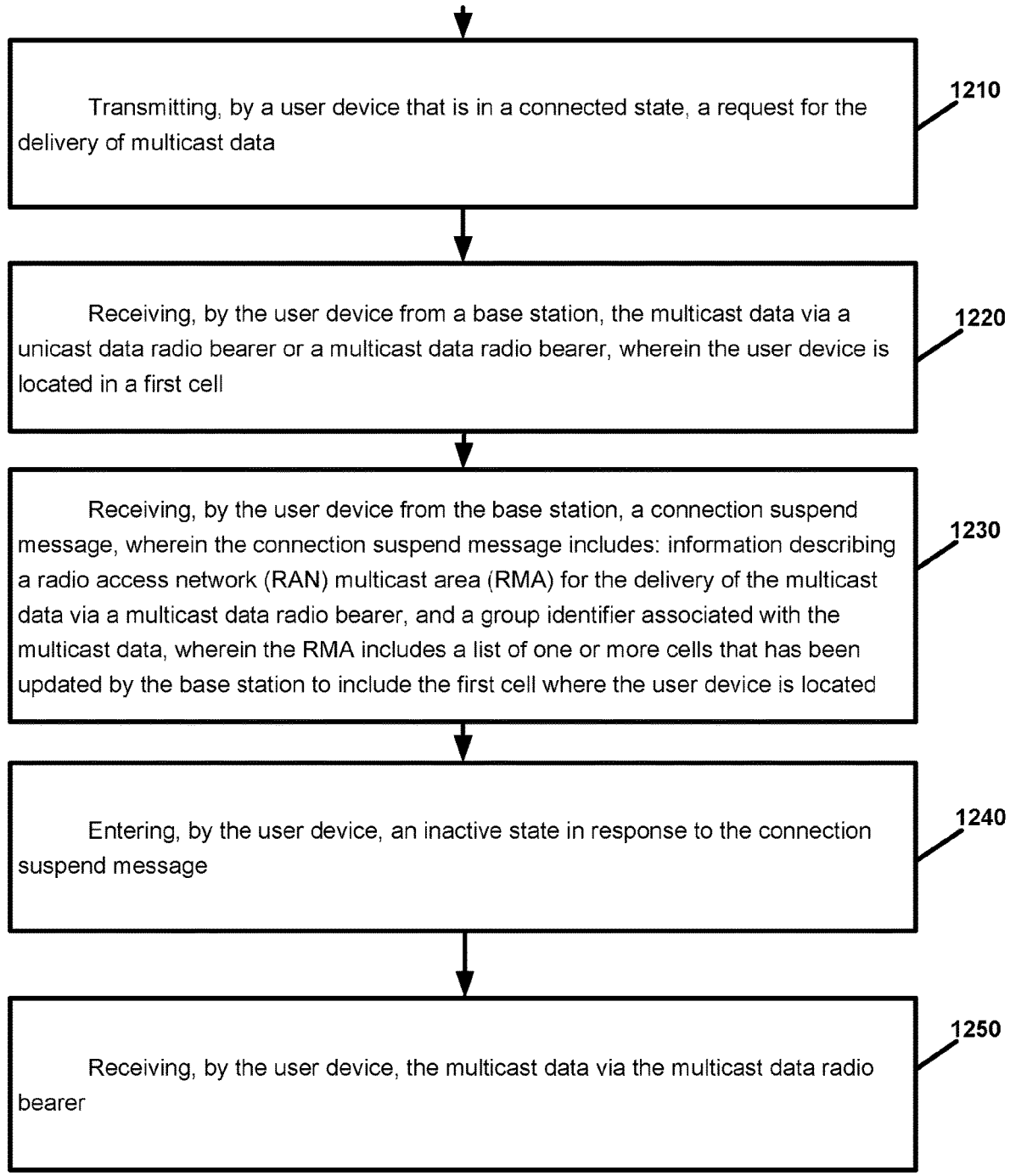
FIG. 12 is a flow chart illustrating operation of a user device according to an example embodiment.

Embodiment 10: FIG. 12 is a flow chart illustrating operation of a user device according to an example embodiment. Operation 1210 includes transmitting, by a user device that is in a connected state, a request for the delivery of multicast data. Operation 1220 includes receiving, by the user device from a base station, the multicast data via a unicast data radio bearer or a multicast data radio bearer, wherein the user device is located in a first cell. Operation 1230 includes receiving, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located. Operation 1240 includes entering, by the user device, a low activity state in response to the connection suspend message. Operation 1250 includes receiving, by the user device, the multicast data via the multicast data radio bearer.

Embodiment 11 According to an example embodiment of embodiment 10, wherein the connection suspend message comprises: information describing a radio access network (RAN) multicast area (RMA) for the delivery of the multicast data, wherein the RMA includes a set of one or more cells in which the multicast data is transmitted over a multicast data radio bearer to one or more user devices that have requested delivery of the multicast data, the information describing the RMA including a RMA identifier and/or information identifying at least a portion of the set of one or more cells of the RMA; and a group identifier associated with the multicast data and the RMA, the group identifier to be used to obtain control information for reception of a downlink channel carrying the multicast data.

Embodiment 12: An apparatus comprising at least one processor and at least one memory including computer instructions, when executed by the at least one processor, cause the apparatus to: transmit, by a user device that is in a connected state, a request for the delivery of multicast data; receive, by the user device from a base station, the multicast data via a unicast data radio bearer or a multicast data radio bearer, wherein the user device is located in a first cell; receive, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located; enter, by the user device, a low activity state in response to the connection suspend message; and receive, by the user device, the multicast data via the multicast data radio bearer.

Figure 13:
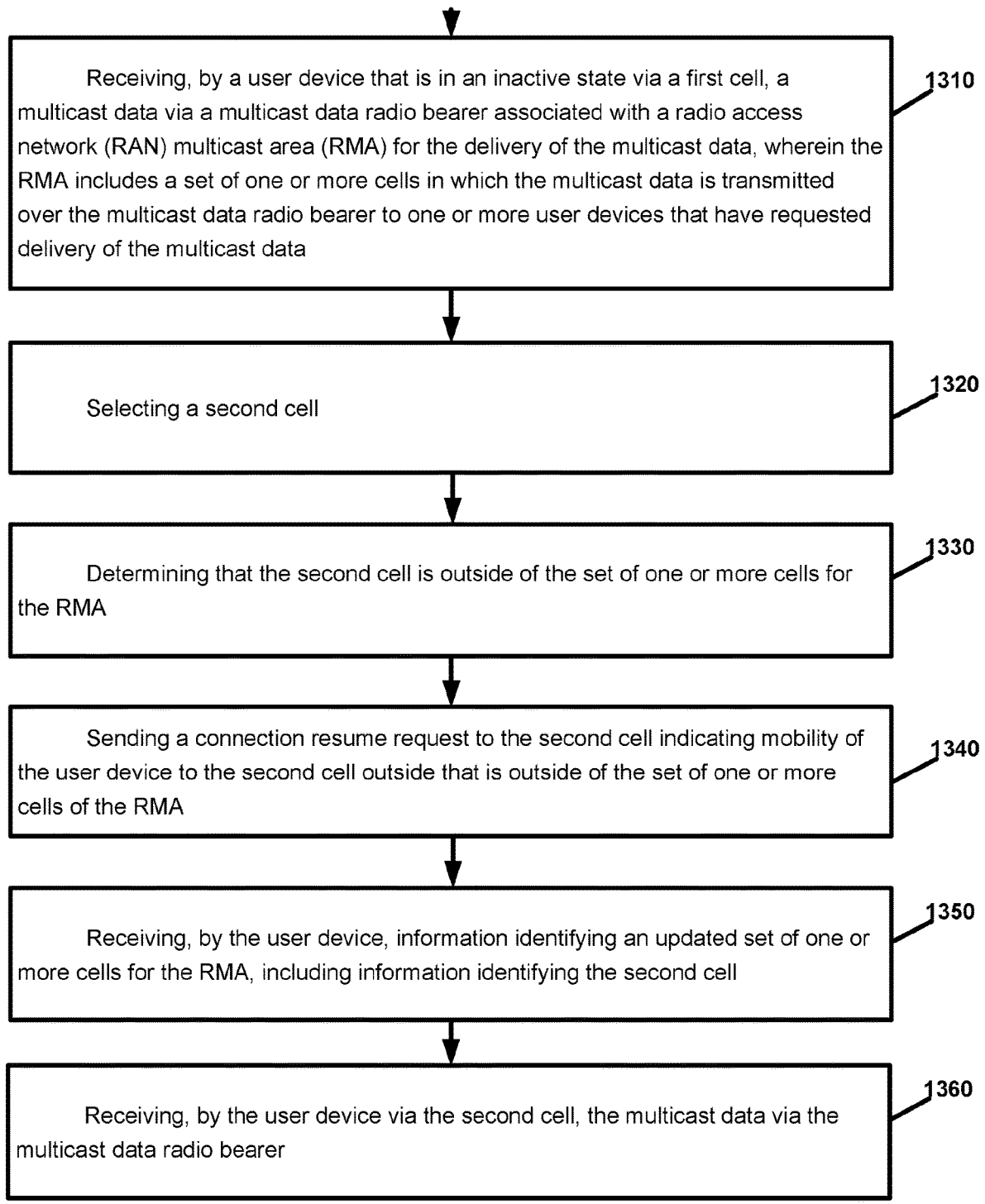
FIG. 13 is a flow chart illustrating operation of a user device according to an example embodiment.

Embodiment 13: FIG. 13 is a flow chart illustrating operation of a user device according to an example embodiment. Operation 1310 includes receiving, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data. Operation 1320 includes selecting a second cell. Operation 1330 includes determining that the second cell is outside of the set of one or more cells for the RMA. Operation 1340 includes sending a connection resume request to the second cell indicating mobility of the user device to the second cell outside that is outside of the set of one or more cells of the RMA. Operation 1350 includes receiving, by the user device, information identifying an updated set of one or more cells for the RMA, including information identifying the second cell. And, operation 1360 includes receiving, by the user device via the second cell, the multicast data via the multicast data radio bearer.

Embodiment 14: According to an example embodiment of embodiment 13, wherein the receiving information identifying an updated set of one or more cells for the RMA comprises: receiving, by the user device via the second cell, a connection suspend message, wherein the connection suspend message includes information describing an updated RMA, including information identifying an updated set of one or more cells for the RMA, including information identifying the second cell; and entering, by the user device, a low activity state in response to the connection suspend message.

Embodiment 15: An apparatus comprising at least one processor and at least one memory including computer instructions, when executed by the at least one processor, cause the apparatus to: receive, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data; select a second cell; determining that the second cell is outside of the set of one or more cells for the RMA; send a connection resume request to the second cell indicating mobility of the user device to the second cell outside that is outside of the set of one or more cells of the RMA; receive, by the user device, information identifying an updated set of one or more cells for the RMA, including information identifying the second cell; and receive, by the user device via the second cell, the multicast data via the multicast data radio bearer.

Figure 14:
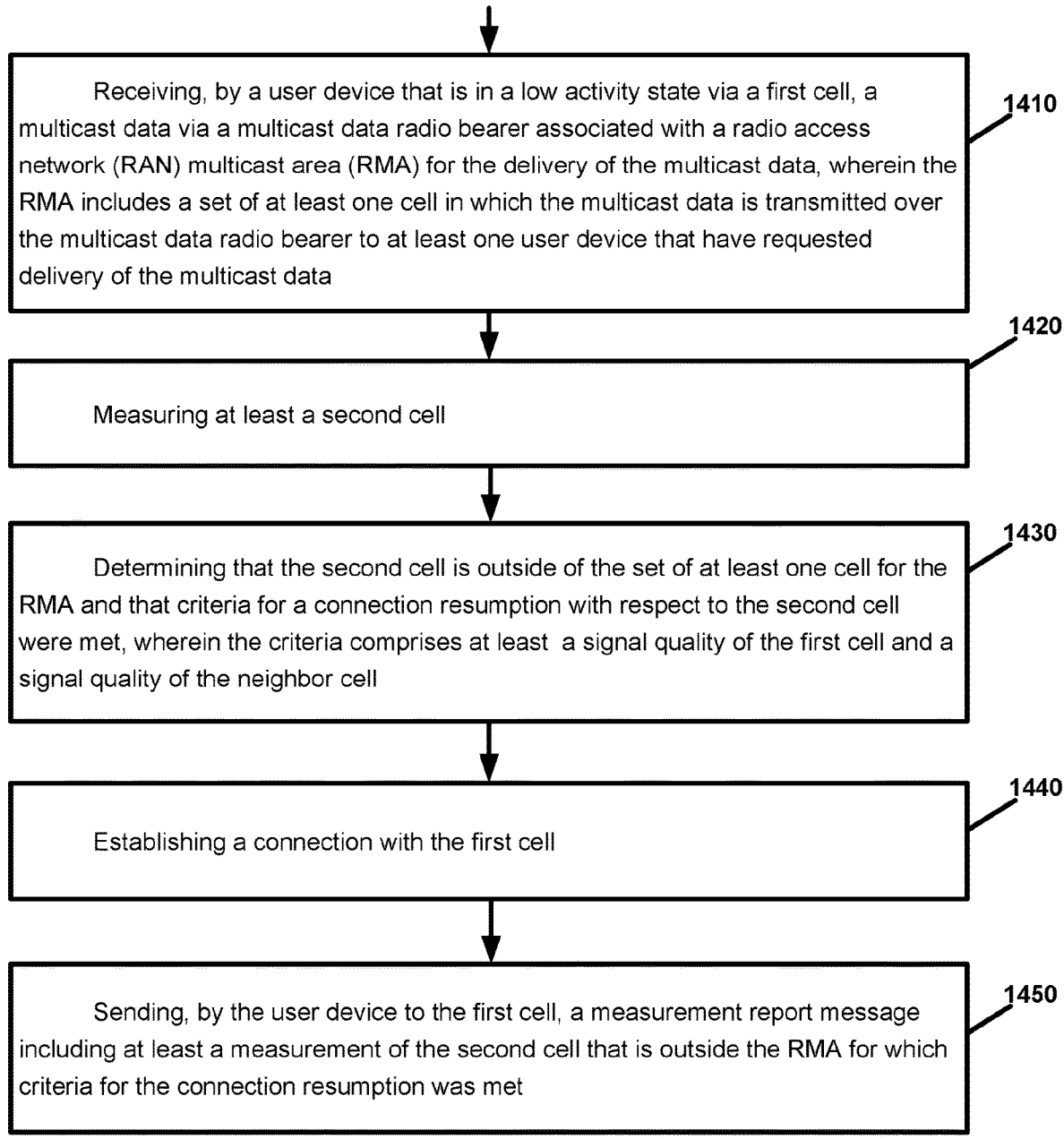
FIG. 14 is a flow chart illustrating operation of a user device according to an example embodiment.

Embodiment 16: FIG. 14 is a flow chart illustrating operation of a user device according to another example embodiment. Operation 1410 includes receiving, by a user device that is in a low activity state via a first cell, a multicast data via a multicast data radio bearer associated with a radio access network (RAN) multicast area (RMA) for the delivery of the multicast data, wherein the RMA includes a set of at least one cell in which the multicast data is transmitted over the multicast data radio bearer to at least one user device that have requested delivery of the multicast data. Operation 1420 includes measuring at least a second cell. Operation 1430 includes determining that the second cell is outside of the set of at least one cell for the RMA and that criteria for a connection resumption with respect to the second cell were met, wherein the criteria comprises at least a signal quality of the first cell and a signal quality of the neighbor cell. Operation 1440 includes establishing a connection with the first cell. And, operation 1450 includes sending, by the user device to the first cell, a measurement report message including at least a measurement of the second cell that is outside the RMA for which criteria for the connection resumption was met.

Embodiment 17: According to an example embodiment of embodiment 16, and further comprising: receiving, by the user device, information identifying an updated set of at least one or more cells for the RMA, including at least information identifying the second cell.

Embodiment 18: According to an example embodiment of any of embodiments 16-17, and further comprising: receiving, by the user device via the first cell, a connection suspend message, wherein the connection suspend message includes information describing an updated RMA, including information identifying an updated set of at least one cell for the RMA, including information identifying at least the second cell; and entering, by the user device, a low activity state in response to the connection suspend message.

Embodiment 19: According to an example embodiment of any of embodiments 16-18, and further comprising: receiving, by the user device via at least one of the first cell and the second cell, the multicast data via the multicast data radio bearer.

Embodiment 20: An apparatus comprising means for performing a method of any of embodiments 1-8, 10, 11, 13, 14 and 16-19.

Embodiment 21: An apparatus comprising at least one processor and at least one memory including computer instructions that, when executed by the at least one processor, cause the apparatus to perform a method of any of embodiments 1-8, 10, 11, 13, 14 and 16-19.

Embodiment 22: An apparatus comprising a computer program product including a non-transitory computer-readable storage medium and storing executable code that, when executed by at least one data processing apparatus, is configured to cause the at least one data processing apparatus to perform a method of any of embodiments 1-8, 10, 11, 13, 14 and 16-19.

Figure 15:
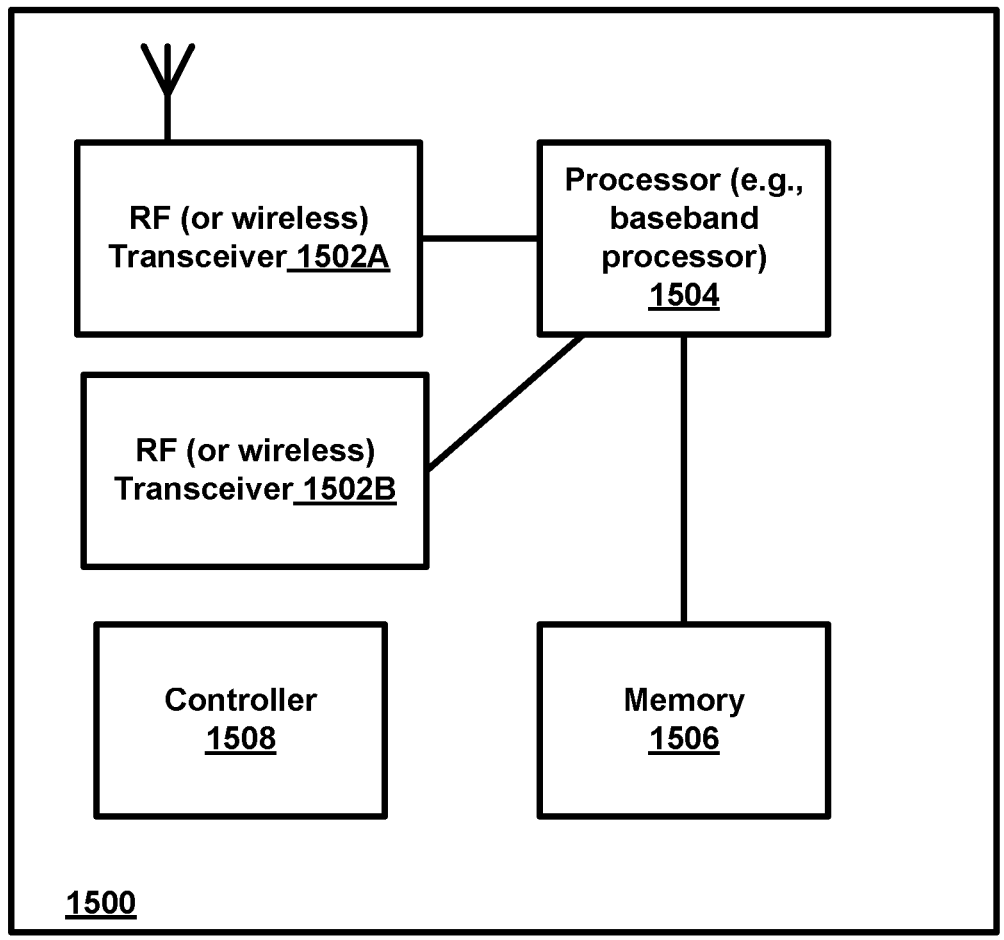
FIG. 15 is a block diagram of a node or wireless station (e.g., base station/access point, relay node or mobile station/user device/UE) according to an example embodiment.

FIG. 15 is a block diagram of a wireless station (e.g., AP, BS, relay node, eNB/gNB, UE or user device) 1500 according to an example embodiment. The wireless station 1500 may include, for example, one or two RF (radio frequency) or wireless transceivers 1502A, 1502B, where each wireless transceiver includes a transmitter to transmit signals and a receiver to receive signals. The wireless station also includes a processor or control unit/entity (controller) 1504 to execute instructions or software and control transmission and receptions of signals, and a memory 1506 to store data and/or instructions.

Processor 1504 may also make decisions or determinations, generate frames, packets or messages for transmission, decode received frames or messages for further processing, and other tasks or functions described herein. Processor 1504, which may be a baseband processor, for example, may generate messages, packets, frames or other signals for transmission via wireless transceiver 1502 (1502A or 1502B). Processor 1504 may control transmission of signals or messages over a wireless network, and may control the reception of signals or messages, etc., via a wireless network (e.g., after being down-converted by wireless transceiver 1502, for example). Processor 1504 may be programmable and capable of executing software or other instructions stored in memory or on other computer media to perform the various tasks and functions described above, such as one or more of the tasks or methods described above. Processor 1504 may be (or may include), for example, hardware, programmable logic, a programmable processor that executes software or firmware, and/or any combination of these. Using other terminology, processor 1504 and transceiver 1502 together may be considered as a wireless transmitter/receiver system, for example.

In addition, referring to FIG. 15, a controller (or processor) 1508 may execute software and instructions, and may provide overall control for the station 1500, and may provide control for other systems not shown in FIG. 7, such as controlling input/output devices (e.g., display, keypad), and/or may execute software for one or more applications that may be provided on wireless station 1500, such as, for example, an email program, audio/video applications, a word processor, a Voice over IP application, or other application or software.

In addition, a storage medium may be provided that includes stored instructions, which when executed by a controller or processor may result in the processor 1504, or other controller or processor, performing one or more of the functions or tasks described above.

According to another example embodiment, RF or wireless transceiver(s) 1502A/1502B may receive signals or data and/or transmit or send signals or data. Processor 1504 (and possibly transceivers 1502A/1502B) may control the RF or wireless transceiver 1502A or 1502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

List of Abbreviations

4G: Fourth Generation
5G: Fifth Generation
AF: Application Function
ASM: Any-Source Multicast
BC: Broadcast
BLER: Block Error Rate
BMSC: Broadcast Multicast Service Center
BS: Base Station
CN: Core Network
CU: Centralized Unit
DN: Data Network
DU Distributed Unit
DRB: Data Radio Bearer
eMBMS: evolved Multimedia Broadcast/Multicast Service
eNB: evolved NodeB (4G BS)
gNB: gigabit NodeB (5G BS)
HDR: High Data Rate
LTE: Long Term Evolution (4G)
MBMS: Multimedia Broadcast/Multicast Service
MBMS-GW: eMBMS Gateway
MCE: Multi-cell/multicast Coordination Entity
MEC: Multi-access Edge Cloud
MICO: Mobile Initiated Connection Only
MN: Mobile Network
MN-gNB: Mobile Network-gigabit NodeB
MNO: Mobile Network Operator
MooD: MBMS operation on Demand
NEF: Network Exposure Function
NF: Network Function
NR: New Radio
NRF: Network Repository Function
NSSAI: Network Slice Selection Assistance Information
NSSF: Network Slice Selection Function
NSSP: Network Slice Selection Policy
PDCP: Packet Data Convergence Protocol
PDU: Protocol Data Unit
PtM: Point-to-Multipoint (usage of either broadcast/multicast over-the-air)
PtP: Point-to-Point (usage of either unicast over-the-air)
QoS: Quality of Service
RB: Radio Bearer
RIAI: RRC_Inactive Assistant Information
RLC: Radio Link Control
RMA: RAN based Multicast Area
RSRP: Reference Signal Received Power
RSRQ: Reference Signal Received Quality
RSSI: Received signal strength indication
(R)AN: (Radio) Access Network
SC-PtM: Single Cell Point-to-Multipoint
SFN: Single Frequency Network
SINR: Signal to Interference and Noise Ratio
SMF: Session Management Function
SSM: Source-Specific Multicast
TMGI: Temporary Mobile Group Identity
TTI: Transmission Time Interval
TV: Television UE: User Equipment (mobile device)
UDM: Unified Data Management
UPF: User Plane Function A number of illustrative examples or embodiments will be described.

What is claimed is:

1. A method comprising:
   determining, by a base station, a radio access network (RAN) multicast area (RMA) for the delivery of associated multicast data to one or more user devices that have requested delivery of the multicast data, wherein the RMA includes a set of one or more cells in which the multicast data is transmitted over a data radio bearer to one or more user devices that have requested delivery of the multicast data;
   transmitting, by the base station, the multicast data via a unicast data radio bearer or a multicast data radio bearer to a first user device that is in a connected state and is located in a first cell that is outside of the RMA;
   detecting a low unicast activity with respect to the first user device;
   sending, by the base station to the first user device, a connection suspend message to cause the first user device to enter a low activity state; and
   updating the RMA to add the first cell where the first user device, while continuing to send the multicast data to the first user device via the multicast data radio bearer.

2. The method of claim 1 and further comprising:
   transmitting, by the base station via the set of one or more cells of the RMA, information describing the RMA, including a RMA identifier and/or information identifying the set of one or more cells of the RMA.

3. The method of claim 1 and further comprising:
   transmitting, by the base station via the multicast data radio bearer, the multicast data to the one or more user devices that are located within the one or more cells of the RMA and have requested delivery of the multicast data.

4. The method of claim 3, wherein the transmitting the multicast data comprises:
   transmitting, after the updating the RMA to add the first cell to the RMA, via the multicast data radio bearer, the multicast data to first user device via the first cell that is now part of the RMA.

5. The method of claim 1 wherein the connection suspend message comprises one or more of the following:
   information describing at least a portion of the RMA, including a RMA identifier and/or information identifying at least a portion of the set of one or more cells of the RMA; and
   a group identifier associated with the multicast data and the RMA, the group identifier to be used by a user device to obtain control information for reception of a downlink channel and/or physical radio resources carrying the multicast data.

6. The method of claim 1 and further comprising:
   transmitting, by the base station via the set of one or more cells of the RMA, information describing the updated RMA, including at least information identifying an updated set of one or more cells of the RMA, including information identifying the first cell that was added to the RMA.

7. The method of claim 1 and further comprising:
   receiving, by the base station via a second cell that is outside of the RMA from a second user device that is one of the one or more user devices that have requested delivery of the multicast data, a connection request indicating mobility of the second user device outside of the RMA;
   updating the RMA to add the second cell where the second user device is located to the RMA; and
   continuing to transmit the multicast data to the one or more user devices via the multicast data radio bearer and via the set of one or more cells of the RMA, including continuing to transmit the multicast data to the second user device via the second cell.

8. The method of claim 1 and further comprising:
   receiving, by the base station via a first cell that is inside of the RMA from a third user device that is one of the one or more user devices that have requested the delivery of the multicast data, a connection request to cause the base station and the third user device to resume connectivity between the base station and the third user device and enter a connected state; and
   receiving, by the base station a measurement report comprising one or more of the following: measurement results of neighboring cells, cell ID information; and
   updating the RMA to add one or more neighboring cells;
   continuing to transmit the multicast data to the one or more user devices via the multicast data radio bearer and via the set of one or more cells of the RMA, including continuing to transmit the multicast data to the third user device via the first cell and the neighboring cell that was added to the RMA.

9. An apparatus comprising at least one processor and at least one memory including computer instructions, when executed by the at least one processor, cause the apparatus to perform the method of claim 1.

10. A method comprising:
    transmitting, by a user device that is in a connected state, a request for the delivery of multicast data;
    receiving, by the user device from a base station, the multicast data via a unicast data radio bearer or a multicast data radio bearer, wherein the user device is located in a first cell;
    receiving, by the user device from the base station, a connection suspend message, wherein the connection suspend message includes: information describing a radio access network (RAN) multicast area (RMA) for the delivery of the multicast data via a multicast data radio bearer, and a group identifier associated with the multicast data, wherein the RMA includes a list of one or more cells that has been updated by the base station to include the first cell where the user device is located;
    entering, by the user device, a low activity state in response to the connection suspend message;
    receiving, by the user device, the multicast data via the multicast data radio bearer.

11. The method of claim 10 wherein the connection suspend message comprises:
    information describing a radio access network (RAN) multicast area (RMA) for the delivery of the multicast data, wherein the RMA includes a set of one or more cells in which the multicast data is transmitted over a multicast data radio bearer to one or more user devices that have requested delivery of the multicast data, the information describing the RMA including a RMA identifier and/or information identifying at least a portion of the set of one or more cells of the RMA; and
    a group identifier associated with the multicast data and the RMA, the group identifier to be used to obtain control information for reception of a downlink channel carrying the multicast data.

12. An apparatus comprising at least one processor and at least one memory including computer instructions, when executed by the at least one processor, cause the apparatus to perform the method of claim 10.

13. A method comprising:
receiving, by a user device that is in a low activity state via a first cell, a multicast data via a multicast data radio bearer associated with a radio access network (RAN) multicast area (RMA) for the delivery of the multicast data, wherein the RMA includes a set of one or more cells in which the multicast data is transmitted over the multicast data radio bearer to one or more user devices that have requested delivery of the multicast data;
selecting a second cell;
determining that the second cell is outside of the set of one or more cells for the RMA;
sending a connection resume request to the second cell indicating mobility of the user device to the second cell outside that is outside of the set of one or more cells of the RMA;
receiving, by the user device, information identifying an updated set of one or more cells for the RMA, including information identifying the second cell; and
receiving, by the user device via the second cell, the multicast data via the multicast data radio bearer.

14. The method of claim 13, wherein the receiving information identifying an updated set of one or more cells for the RMA comprises:
receiving, by the user device via the second cell, a connection suspend message, wherein the connection suspend message includes information describing an updated RMA, including information identifying an updated set of one or more cells for the RMA, including information identifying the second cell; and
entering, by the user device, a low activity state in response to the connection suspend message.

15. An apparatus comprising at least one processor and at least one memory including computer instructions, when executed by the at least one processor, cause the apparatus to perform the method of claim 13.

16. The method of claim 13, further comprising:
measuring at least a second cell;
determining that the second cell is outside of the set of at least one cell for the RMA and that criteria for a connection resumption with respect to the second cell were met, wherein the criteria comprises at least-a signal quality of the first cell and a signal quality of the neighbor cell;
establishing a connection with the first cell; and
sending, by the user device to the first cell, a measurement report message including at least a measurement of the second cell that is outside the RMA for which criteria for the connection resumption was met.

17. The method of claim 16, and further comprising:
receiving, by the user device, information identifying an updated set of at least one or more cells for the RMA, including at least information identifying the second cell.

18. The method of claim 16, and further comprising:
receiving, by the user device via the first cell, a connection suspend message, wherein the connection suspend message includes information describing an updated RMA, including information identifying an updated set of at least one cell for the RMA, including information identifying at least the second cell; and
entering, by the user device, a low activity state in response to the connection suspend message.

19. The method of claim 16, and further comprising:
receiving, by the user device via at least one of the first cell and the second cell, the multicast data via the multicast data radio bearer.

20. An apparatus comprising a computer program product including a non-transitory computer-readable storage medium and storing executable code that, when executed by at least one data processing apparatus, is configured to cause the at least one data processing apparatus to perform the method of claim 13.

* * * * *